(12) United States Patent
Miyano et al.

(10) Patent No.: US 11,034,271 B2
(45) Date of Patent: Jun. 15, 2021

(54) VENTILATION MAT

(71) Applicant: KURABE INDUSTRIAL CO., LTD., Hamamatsu (JP)

(72) Inventors: Daisuke Miyano, Shizuoka (JP); Yuya Ota, Shizuoka (JP); Remuto Yamaguchi, Shizuoka (JP); Norishige Morishita, Shizuoka (JP)

(73) Assignee: KURABE INDUSTRIAL CO., LTD., Hamamatsu (JP)

( * ) Notice: Subject to any disclaimer, the term of this patent is extended or adjusted under 35 U.S.C. 154(b) by 22 days.

(21) Appl. No.: 16/618,064

(22) PCT Filed: May 25, 2018

(86) PCT No.: PCT/JP2018/020202
§ 371 (c)(1),
(2) Date: Nov. 27, 2019

(87) PCT Pub. No.: WO2018/221419
PCT Pub. Date: Dec. 6, 2018

(65) Prior Publication Data
US 2021/0122272 A1 Apr. 29, 2021

(30) Foreign Application Priority Data

May 31, 2017 (JP) .............................. JP2017-108424
Oct. 24, 2017 (JP) .............................. JP2017-204922
Dec. 22, 2017 (JP) .............................. JP2017-245950

(51) Int. Cl.
*A47C 7/74* (2006.01)
*B60N 2/56* (2006.01)
(Continued)

(52) U.S. Cl.
CPC .......... *B60N 2/5642* (2013.01); *B60N 2/5685* (2013.01)

(58) Field of Classification Search
CPC .............. H05B 3/342; H05B 2203/004; H05B 2203/003; H05B 2203/014; B60N 2/5685; B60N 2/5642
See application file for complete search history.

(56) References Cited

U.S. PATENT DOCUMENTS 5,403,065 A * 4/1995 Callerio ................... A47C 7/74
297/180.11
6,969,827 B2 * 11/2005 Yoneyama ........... B60N 2/5685
219/202
(Continued)

FOREIGN PATENT DOCUMENTS

JP 4107033 B2 6/2008
JP 4999455 B2 8/2012

*Primary Examiner* — Shin H Kim
(74) *Attorney, Agent, or Firm* — McCoy Russell LLP

(57) ABSTRACT

A ventilation mat according to the present invention is a ventilation mat including: a ventilation mat body including a plurality of tubes coupled to one another in a sheet shape; and a ventilation guide connected to a side surface of the ventilation mat body, in which the ventilation mat body includes: a ventilation part with a slit provided on a side of the plurality of tubes coming into contact with the skin cover so as to be extended across the plurality of tubes, the ventilation part being coupled, with a material of the tube, to a side of the plurality of tubes coming into contact with the sheet cushioning material; and an air flow mixing part that is provided closer to a connection part of the ventilation guide than the ventilation part is, and communicates between the plurality of tubes.

10 Claims, 20 Drawing Sheets

(51) Int. Cl.
*A47C 7/72* (2006.01)
*B60N 2/26* (2006.01)

(56) References Cited

U.S. PATENT DOCUMENTS

| | | | | |
|---|---|---|---|---|
| 7,083,236 | B1* | 8/2006 | Smith | A47C 7/742 |
| | | | | 297/229 |
| 9,139,118 | B2* | 9/2015 | Berroth | B60N 2/5642 |
| 9,527,418 | B2* | 12/2016 | Sachs | B60N 2/995 |
| 10,118,520 | B2* | 11/2018 | Craig | B60N 2/5642 |
| 2004/0036326 | A1* | 2/2004 | Bajic | B60N 2/5685 |
| | | | | 297/180.14 |
| 2004/0069762 | A1* | 4/2004 | Yoneyama | B60N 2/7017 |
| | | | | 219/217 |
| 2009/0134675 | A1* | 5/2009 | Pfahler | B60N 2/5635 |
| | | | | 297/180.1 |
| 2011/0260509 | A1* | 10/2011 | Siu | A47C 7/021 |
| | | | | 297/180.14 |
| 2013/0300159 | A1* | 11/2013 | Berroth | B60N 2/5657 |
| | | | | 297/180.14 |
| 2015/0061331 | A1* | 3/2015 | Yang | A47C 7/727 |
| | | | | 297/180.14 |
| 2015/0069811 | A1* | 3/2015 | Sachs | B60N 2/995 |
| | | | | 297/423.1 |
| 2016/0096460 | A1* | 4/2016 | Storgato | B60N 2/5621 |
| | | | | 297/180.13 |
| 2017/0361742 | A1* | 12/2017 | Craig | B60N 2/5642 |
| 2020/0108752 | A1* | 4/2020 | Morishita | A47C 7/744 |

* cited by examiner

FRONT SURFACE

REAR SURFACE

SIDE SURFACE

VENTILATION MAT

CROSS-REFERENCE TO RELATED APPLICATIONS

The present application is a U.S. National Phase of International Patent Application Serial No. PCT/JP2018/020202 entitled "VENTILATION MAT," filed on May 25, 2018. International Patent Application Serial No. PCT/JP2018/020202 claims priority to Japanese Patent Application No. 2017-108424 filed on May 31, 2017 and Japanese Patent Application No. 2017-204922 filed on Oct. 24, 2017 and Japanese Patent Application No. 2017-245950 filed on Dec. 22, 2017. The entire contents of each of the above-referenced applications are hereby incorporated by reference for all purposes.

TECHNICAL FIELD

The present invention relates to a ventilation mat, and in particular, to a ventilation mat integrated into a seat of an automobile and configured to perform ventilation to a seat surface and a backrest.

BACKGROUND ART

In recent years, as one method for improving comfort of the interior space of an automobile, a ventilation system for ventilating a seat surface and a backrest of an automobile seat has been incorporated into the automobile. Patent Literature 1 discloses an example of this ventilation system.

The ventilating apparatus for a seat disclosed in Patent Literature 1 includes: an air-blowing source; and a ventilation path connected to the air-blowing source and formed into a sheet shape by being integrated in parallel while a plurality of tubes are brought into contact with one another, in which an air outlet port is formed in a slit shape in the ventilation path.

CITATION LIST

Patent Literature

Patent Literature 1: Japanese Patent No. 4999455
Patent Literature 2: Japanese Patent No. 4107033

SUMMARY OF INVENTION

Technical Problem

However, in the ventilating apparatus for a seat disclosed in Patent Literature 1, in order to evenly distribute an air flow from the air-blowing source to the plurality of tubes formed in a sheet shape, it is necessary for all the tubes to be connected to a sending port of the air-blowing source. Therefore, in the ventilating apparatus for a seat disclosed in Patent Literature 1, it is necessary for a part in which a plurality tubes are bundled to be housed in a seat so that the seating feeling of the seat is not impaired. This causes a problem that the degree of freedom in designing the seat is reduced.

Solution to Problem

One aspect of a ventilation mat according to the present invention is a ventilation mat provided between a seat cushioning material and a skin cover covering the seat cushioning material, the ventilation mat including: a ventilation mat body including a plurality of tubes coupled to one another in a sheet shape; and a ventilation guide with a fan attachment hole provided at one end thereof, the other end of the ventilation guide being connected to a side surface of the ventilation mat body, in which the ventilation mat body includes: a ventilation part with a slit provided on a side of the plurality of tubes coming into contact with the skin cover so as to be extended across the plurality of tubes, the ventilation part being coupled, with a material of the tube, to a side of the plurality of tubes coming into contact with the seat cushioning material; and an air flow mixing part that is provided closer to a connection part of the ventilation guide than the ventilation part is and communicates between the plurality of tubes, and the ventilation guide is a non-air-permeable tube, and includes a ventilation path formed inside thereof by a base material having an air-permeable three-dimensional structure.

Advantageous Effects of Invention

The ventilation mat according to the present invention makes it possible to reduce limitations on designing a seat due to a shape of a ventilation mat.

DESCRIPTION OF EMBODIMENTS

First Embodiment

Hereinafter, embodiments according the present invention will be described with reference to the drawings. A ventilation mat described below is provided on at least one of a seat surface of an automobile seat and a backrest thereof. Further, the ventilation mat according to the present invention is installed so as to be sandwiched between a cushioning material of the automobile seat and a skin cover covering the cushioning material. Further, a fan is provided in the ventilation mat. This fan sucks air from the ventilation mat or allows air to flow into the ventilation mat.

In the following description, in a state in which the ventilation mat is installed in the automobile seat, the surface located on the skin cover side, that is, the seat surface side is referred to as a front surface, and the surface located on the cushioning material side of the automobile seat is referred to as a rear surface.

Figure 1:
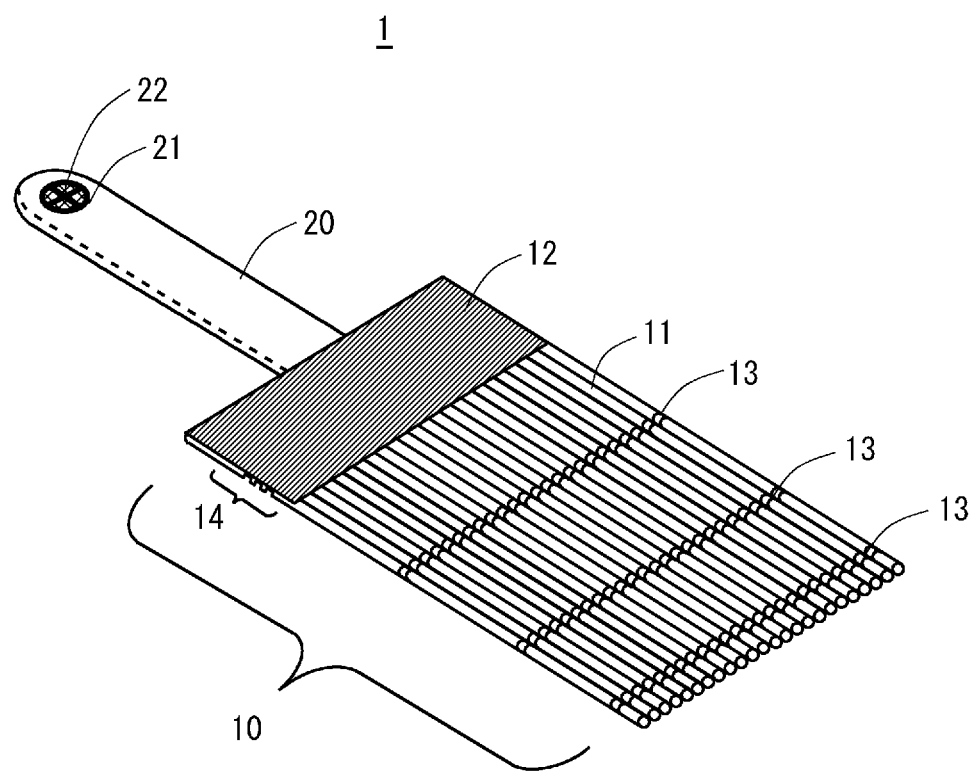
FIG. 1 is a schematic diagram of a ventilation mat according to a first embodiment.

FIG. 1 shows a schematic diagram of a ventilation mat 1 according to a first embodiment. FIG. 1 shows a perspective view of the ventilation mat 1. As shown in FIG. 1, the ventilation mat 1 according to the first embodiment includes a ventilation mat body 10 and a ventilation guide 20.

The ventilation mat body 10 has a structure composed of a plurality of tubes 11 coupled to one another in a sheet shape as a main structure. Each of these tubes 11 is formed of, for example, a resin such as an olefin-based thermoplastic elastomer. Examples of a method for coupling the plurality of tubes 11 to one another include a method for integrally forming the plurality of tubes 11 so that they are arranged in a sheet shape, a method for bonding the plurality of tubes 11 cut into a predetermined length to one another, and a method for bonding the plurality of tubes 11 cut into a predetermined length to a cloth such as a nonwoven fabric.

A ventilation part 13 and an air flow mixing part 14 are provided in the ventilation mat body 10. The ventilation part 13 is a part in which a slit is provided on the side of the plurality of tubes 11 coming into contact with the skin cover, and is coupled, with a material forming the tube, to the side of the plurality of tubes 11 coming into contact with the seat cushioning material. One aspect of the ventilation part 13 is a groove provided by cutting the tubes in a direction orthogonal to the direction in which the tubes 11 are extended. In FIG. 1, three ventilation parts 13 are provided in the ventilation mat body 10.

Further, the air flow mixing part 14 is provided closer to the connection part of the ventilation guide 20 than the ventilation part 13 is, and is provided so as to communicate between the plurality of tubes 11. In the example shown in FIG. 1, the air flow mixing part 14 is a groove provided by cutting the tube in a direction orthogonal to the direction in which the tubes 11 are extended so that a slit is provided on the seat cushioning material side of the ventilation mat body 10. Further, the air flow mixing part 14 provided in the ventilation mat body 10 according to the first embodiment has a form in which the side of the tube, which comes into contact with the skin cover covering a seat, is not cut out and is left. The air flow mixing part 14 is a space in which the adjacent tubes are communicated with each other, and diffuses or mixes, in this space, the air that flows through the plurality of tubes constituting the ventilation mat body 10. Note that in the air flow mixing part 14, the efficiency of diffusing air can be increased by increasing the flatness of the bottom of a slit.

Further, in the example shown in FIG. 1, in the ventilation mat body 10, a nonwoven fabric 12 is attached to the part in which the ventilation guide 20 includes a connection part. Furthermore, the nonwoven fabric 12 is attached to the rear surface of the ventilation mat body 10 (e.g., the surface on which an opening of the air flow mixing part 14 is provided), which is not shown in FIG. 1. The nonwoven fabric 12 attached to the rear surface of the ventilation mat body 10 may cover or may not cover the air flow mixing part 14, and the attachment range of the nonwoven fabric 12 may be different for each product.

In the following description, the side facing the skin cover of the surfaces of the ventilation mat 1 according to the first embodiment (i.e., the side on which an opening of the ventilation part 13 is provided) is referred to as a front surface side, and the side facing the seat cushioning material of the surfaces of the ventilation mat 1 according to the first embodiment (i.e., the side on which the opening of the air flow mixing part 14 is provided) is referred to as a rear surface side.

The ventilation guide 20 is a non-air-permeable tube, and includes a ventilation path formed inside thereof by a base material (e.g., a spacer 22) having an air-permeable three-dimensional structure. For example, a 3D mesh sheet in which fibers are three-dimensionally knitted can be used for this spacer 22. Further, a film formed into a bag-like shape can be used as a non-air-permeable tube, and a resin such as polypropylene can be used as a film material.

An opening is provided at one end of the ventilation guide 20 so that the spacer 22 is exposed. A mold made of a plastic material is fitted into this opening, whereby a fan attachment hole 21 is formed. The other end of the ventilation guide 20 is inserted into the connection hole provided in the ventilation mat body 10. In FIG. 1, the part in which the ventilation guide 20 and the ventilation mat body 10 are connected to each other is covered by the nonwoven fabric 12. In the ventilation mat 1 according to the first embodiment, while the ventilation guide 20 is inserted into the ventilation mat body 10, the ventilation mat body 10 and the ventilation guide 20 are connected to each other so that they are not disconnected from each other by winding the nonwoven fabric 12 with a double-faced tape around them. At this time, if laser welding or the like is performed on the ventilation guide 20 and the ventilation mat body 10, they are connected to each other in a more stable manner. As a method for connecting the ventilation guide 20 to the ventilation mat body 10, any conventionally known methods such as adhesion, pressure sensitive adhesion, and welding may be used.

By using a nonwoven fabric with a double-faced tape, it is possible to close the opening at the end of the ventilation mat body 10 on the ventilation guide side, and prevent the air flow from leaking therefrom or entering thereinto. That is, the nonwoven fabric 12 functions as an air flow leakage preventing part that closes the openings at the ends of the ventilation guide side of the plurality of tubes 11 constituting the ventilation mat body 10 and prevents the air flow from leaking therefrom or entering thereinto.

Figure 2:
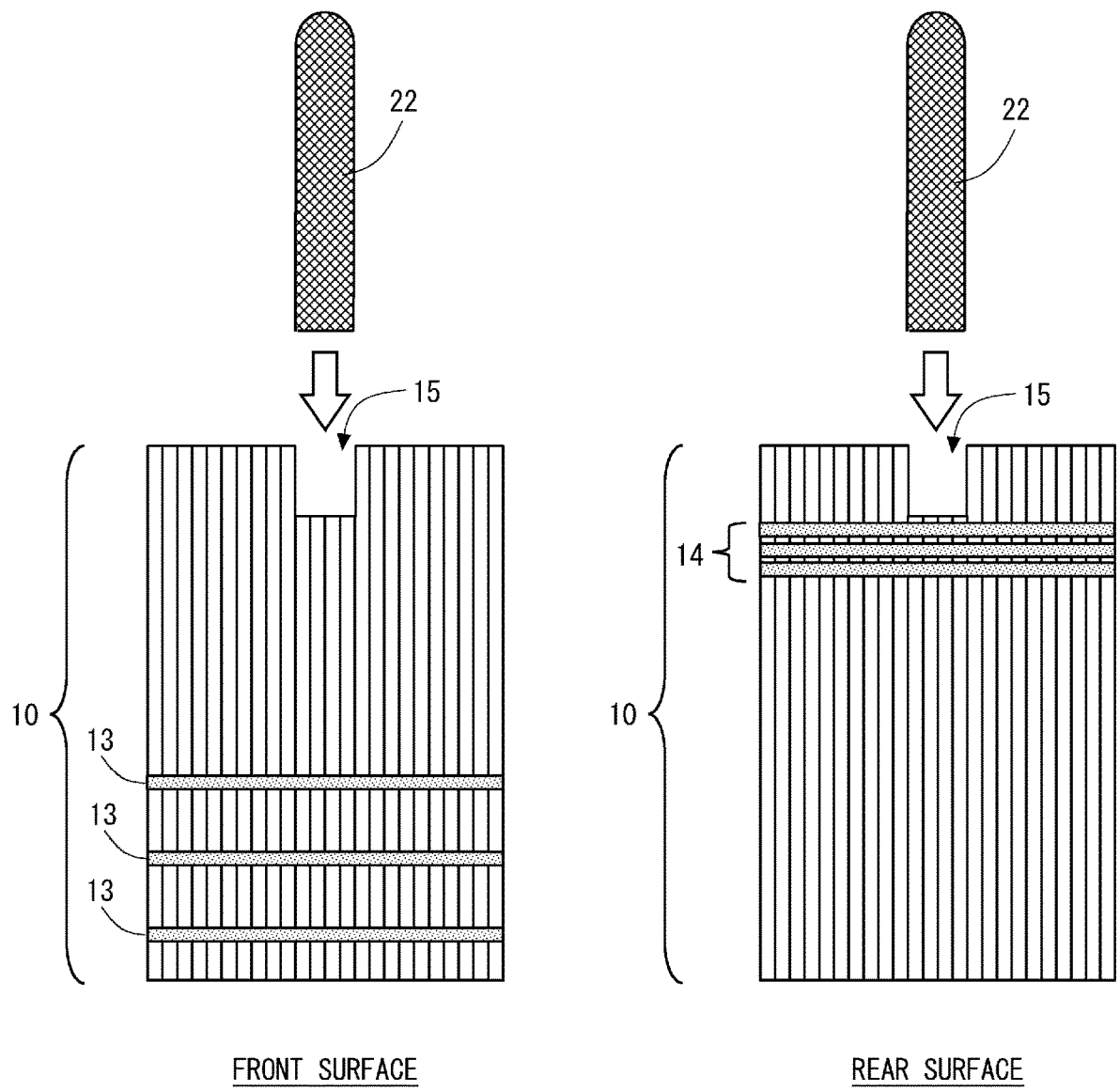
FIG. 2 is a diagram for explaining the detailed structure of the ventilation mat according to the first embodiment.
Figure 2:
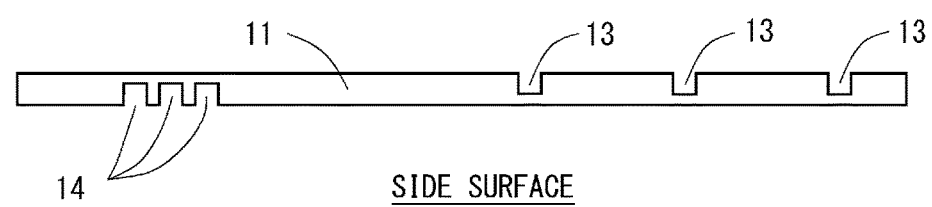

The shapes of the ventilation mat body 10 and the spacer 22 according to the first embodiment is more specifically described here. FIG. 2 shows a diagram for explaining the detailed structure of the ventilation mat according to the first embodiment. In FIG. 2, a schematic diagram of the ventilation mat 1 when the ventilation mat 1 is viewed from the front surface thereof, a schematic diagram of the ventilation mat 1 when the ventilation mat 1 is viewed from the rear surface thereof, and a schematic diagram of the ventilation mat body 10 when the ventilation mat body 10 is viewed from the side surface thereof are shown. Further, FIG. 2 shows only the shape of the spacer 22 constituting the ventilation path in the ventilation guide 20 among the components of the ventilation guide 20.

As shown in FIG. 2, a notched part 15 is provided in the ventilation mat body 10.

Meanwhile, although the width of the shape of the spacer 22 to be inserted into the ventilation mat body 10 is the same as that of the part to be covered with a bag-like non-air-permeable tube having a bag-like shape, a part to be inserted into the notched part 15 while being covered with the non-air-permeable tube is exposed. The notched part 15 of the ventilation mat body 10 serves as the connection part for connecting the ventilation guide 20 to the ventilation mat body 10. By forming the spacer 22 in such a shape, it is possible to improve the member utilization efficiency when the spacer 22 is cut out from the original 3D mesh sheet material.

Further, as shown in FIG. 2, the ventilation part 13 is provided on the front surface side of the ventilation body 10. When this ventilation part 13 is seen from the side surface thereof, it is understood that it is a groove that has been carved in the tube 11 and is opened on the front surface side of the ventilation mat body 10. Further, the air flow mixing part 14 is provided on the rear surface side of the ventilation mat body 10. When this air flow mixing part 14 is seen from the side surface thereof, it is understood that it is a groove that has been carved in the tube 11 and that is opened on the rear surface side of the ventilation mat body 10. Further, the air flow mixing part 14 is provided between the ventilation part 13 and the notched part 15. Note that by providing the air flow mixing part 14 as close to the notched part 15 as possible, the generation of an air flow in a lateral direction (e.g., a direction in which a groove serving as the air flow mixing part 14 is extended) is promoted by the spacer 22 connected to the notched part 15, thereby enabling the diffusion effect of the air flow flowing through the plurality of tubes 11 to be enhanced.

Figure 3:
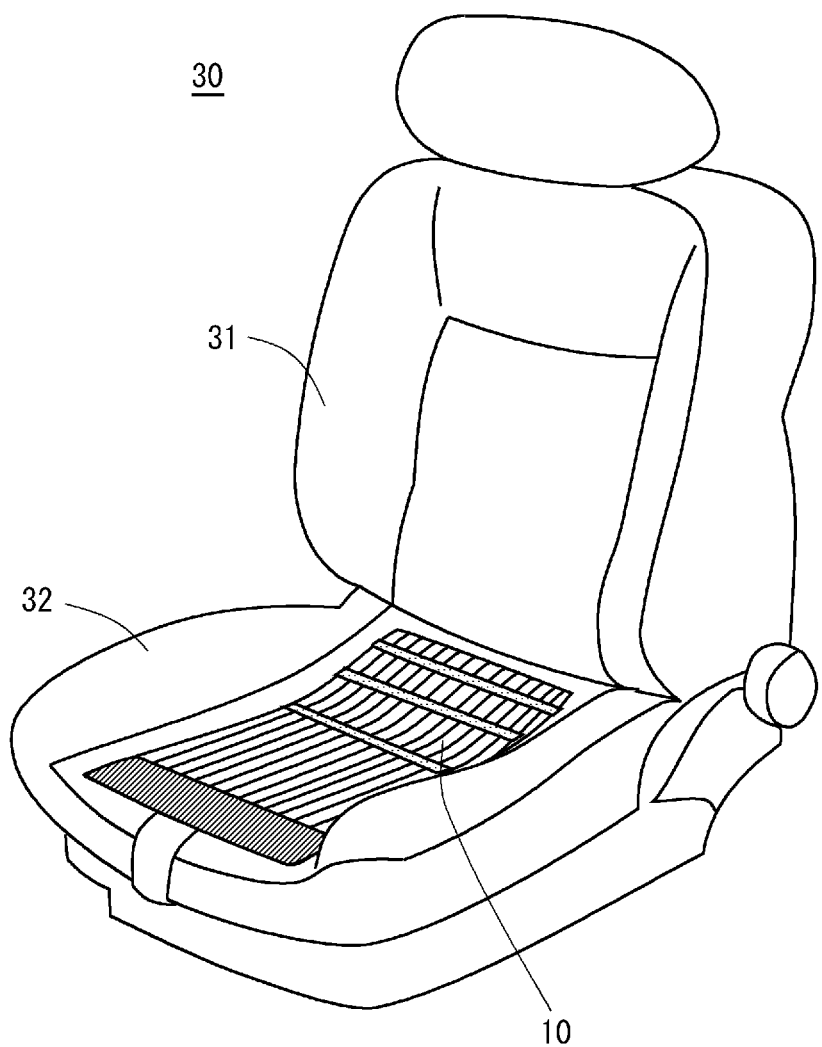
FIG. 3 is a schematic diagram of an automobile seat on which the ventilation mat according to the first embodiment is mounted.

Next, a configuration in which the ventilation mat 1 according to the first embodiment is integrated into an automobile seat is described. FIG. 3 shows a schematic diagram of the automobile seat on which the ventilation mat according to the first embodiment is mounted. The ventilation mat 1 according to the first embodiment is mounted in an automobile seat 30 in a state in which it is hidden by the skin cover since it is actually installed under the skin cover. Therefore, in the schematic diagram shown in FIG. 3, the ventilation mat body 10 is shown on a seat surface 32 so that the part of the automobile seat 30 in which the ventilation mat 1 is installed can be seen.

In the example shown in FIG. 3, the ventilation mat body 10 is provided on the seat surface 32. As shown in FIG. 3, the ventilation mat body 10 of the ventilation mat 1 is installed in the seat surface 32. Meanwhile, the ventilation guide 20 is routed through or around the automobile seat 30 to the rear surface side thereof so that the fan attachment hole 21 is positioned on the rear surface side thereof. Further, the ventilation mat 1 according to the first embodiment is installed so that the ventilation part 13 is located on the side where a person is seated and the air flow mixing part 14 is located on the seat cushion side (not shown). Further, in the seat cushioning material constituting the seat surface 32, a concave part corresponding to the shapes of the ventilation mat body 10 and the ventilation guide 20 is formed in order to embed the ventilation mat body 10 and the ventilation guide 20, the drawing of which is omitted. Then, the ventilation mat body 10 and the ventilation guide 20 are installed so as to be fitted into this concave part.

As described above, in the ventilation mat 1 according to the first embodiment, the spacer 22 made of a soft material is covered with a non-permeable tube, and the ventilation guide 20 having a thickness approximately the same as that of the ventilation mat body 10 is connected to the ventilation mat body 10. This structure makes it possible, in the ventilation mat 1 according to the first embodiment, to form the ventilation mat body 10 and the ventilation guide 20 that serves as a path for the air flow flowing in the ventilation mat body 10 so that they have substantially the same thickness as each other. Thus, it is possible for the ventilation mat 1 according to the first embodiment to reduce limitations on designing a seat due to the shape of the ventilation mat 1, thereby improving the degree of freedom in designing a seat.

Further, if the ventilation guide 20 has such a shape that it comes into contact with only some of the plurality of tubes 11 constituting the ventilation mat body 10, a problem that the amount of the air flows flowing through the plurality of tubes 11 constituting the ventilation mat body 10 cannot be uniform occurs. However, by providing the air flow mixing part 14, the ventilation mat 1 according to the first embodiment can guide the air flow, which flows through the tube 11 located distant from the connection part in which the ventilation guide 20 is connected to the ventilation mat body 10, to the connection part via the air flow mixing part 14. Accordingly, in the ventilation mat 1 according to the first embodiment, the air flow that flows through the plurality of tubes 11 constituting the ventilation mat body 10 can be made substantially uniform even if the ventilation mat body 10 and the ventilation guide 20 are only partially connected to each other.

Further, the ventilation mat 1 according to the first embodiment is entirely formed of a material having a high plasticity such as a 3D mesh sheet, a tube formed of a non-permeable film, or an elastomer tube and the thickness of the components including the ventilation guide 20 are made substantially uniform. By doing so, the ventilation mat 1 according to the first embodiment does not impair the softness of the seat surface, thereby enabling the seating feeling of the automobile seat to be improved.

Further, the ventilation guide 20 according to the first embodiment is obtained by covering a mesh sheet having a hollow structure and a three-dimensional structure with a non-permeable tube, and the ventilation guide 20 will be lighter than the plurality of tubes 11 constituting the ventilation mat body 10 if the length of the ventilation guide 20 is the same as that of the tubes 11. That is, in the ventilation mat 1 according to the first embodiment, a flow path that guides the air flow to the ventilation mat body 10 can be formed of a light component, whereby the overall weight is reduced. Further, the cost of the ventilation guide 20 is lower than that of the ventilation mat body 10 having the same length as that of the ventilation guide 20. Accordingly, the ventilation mat according to the first embodiment can achieve a cost reduction compared to a case in which an air flow generated by a fan is guided to the ventilation mat body 10.

Second Embodiment

Figure 4:
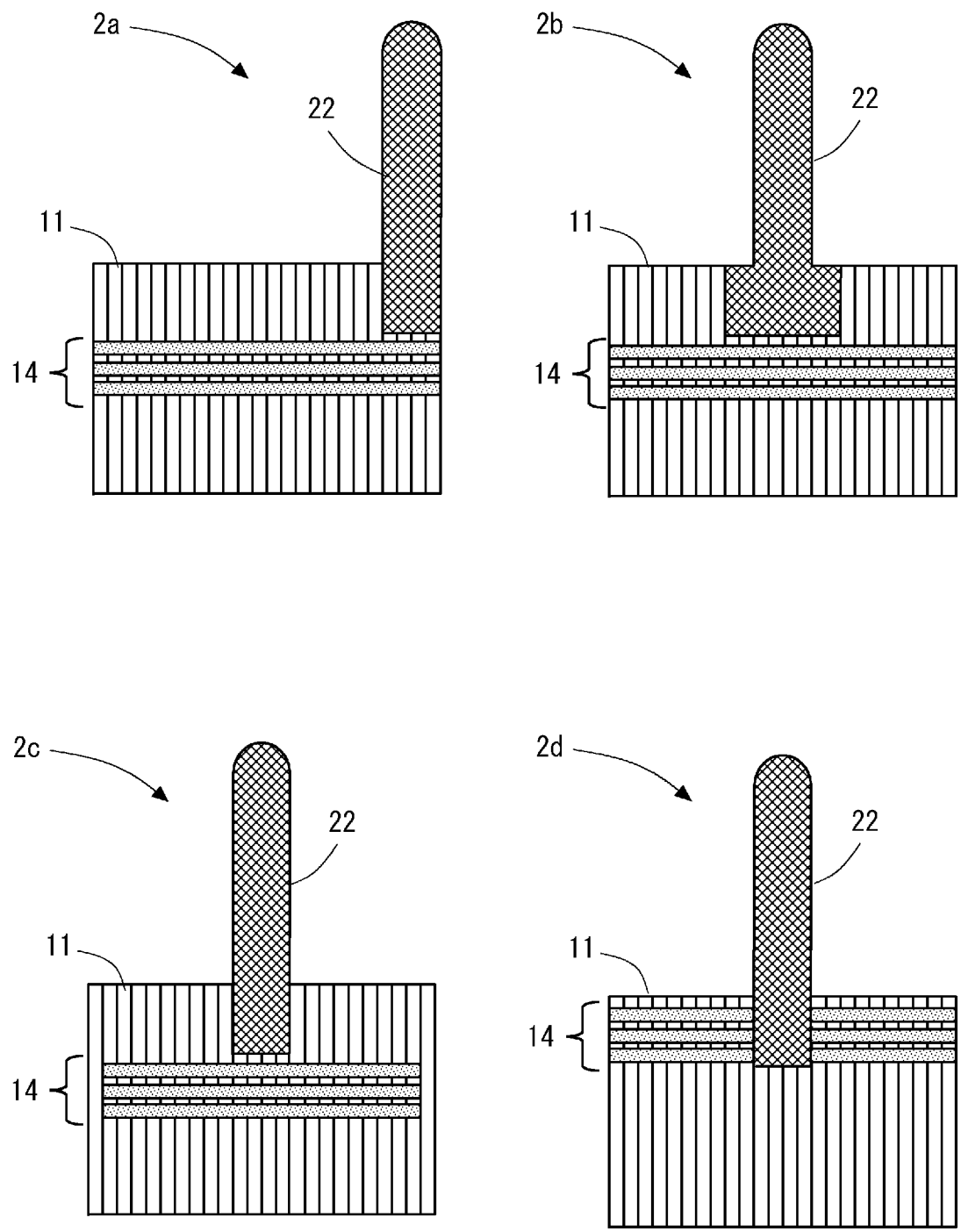
FIG. 4 shows schematic diagrams of first to fourth examples of an air flow mixing part of the ventilation mat according to the second embodiment.
Figure 5:
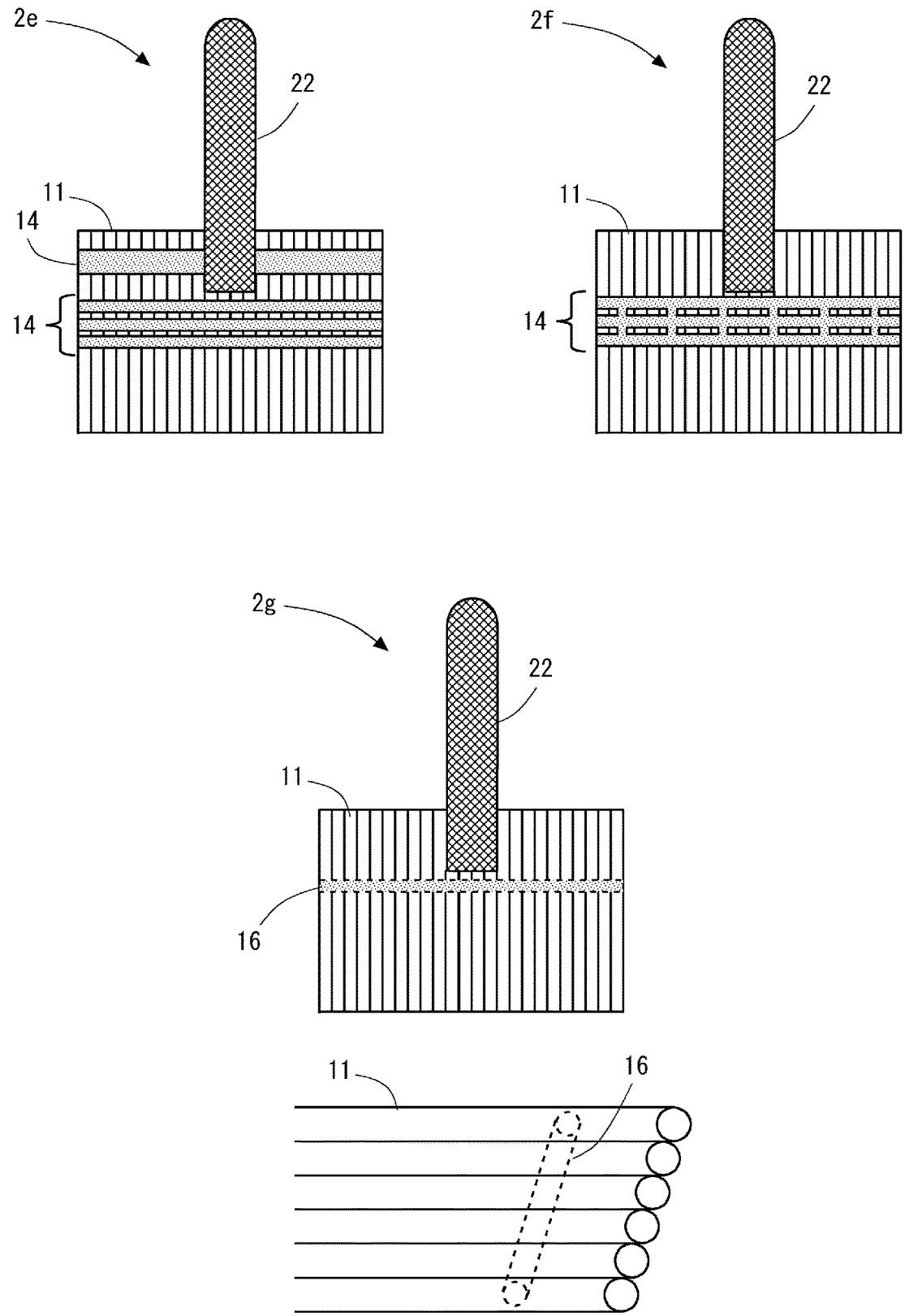
FIG. 5 shows schematic diagrams of fifth to seventh examples of the air flow mixing part of the ventilation mat according to the second embodiment.
Figure 6:
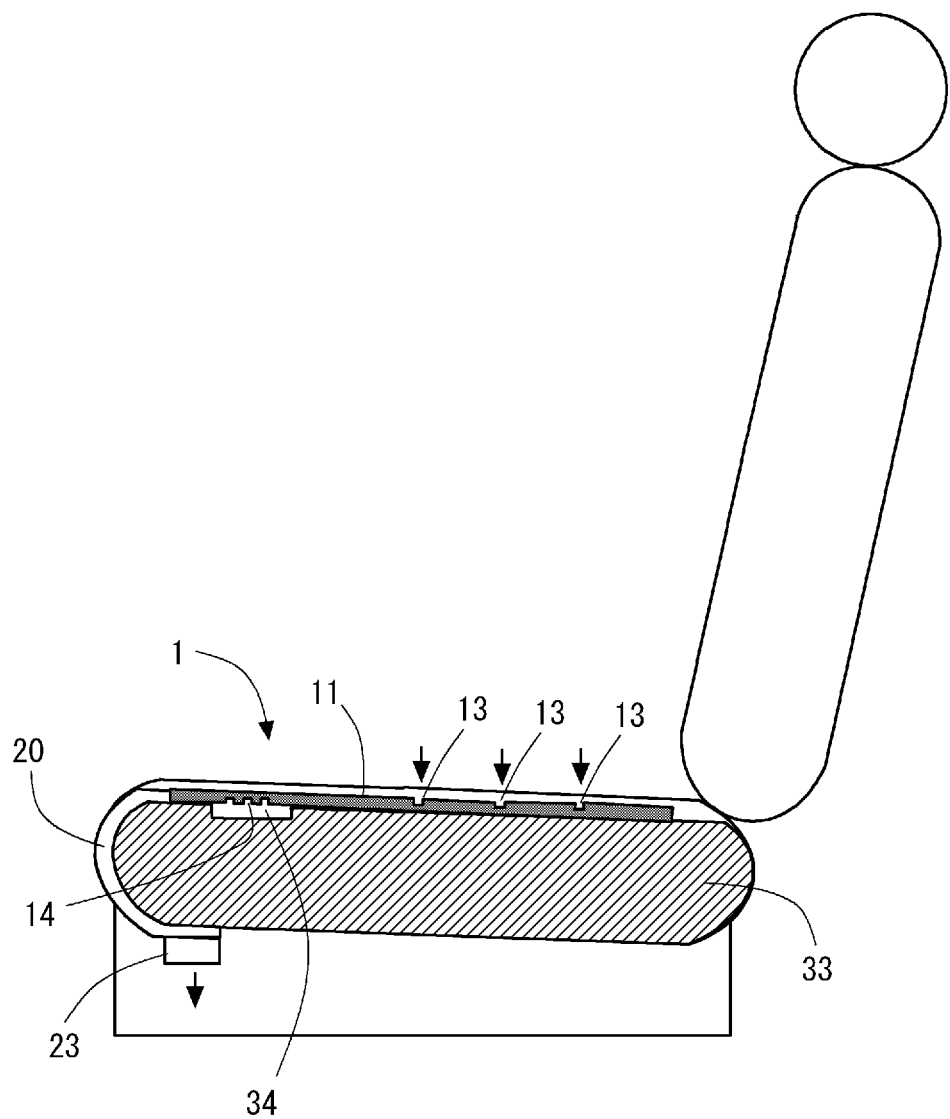
FIG. 6 is a schematic diagram of an eighth example of the air flow mixing part of the ventilation mat according to the second embodiment.

In a second embodiment, variations in the shape of the air flow mixing part 14 are described. FIGS. 4 to 6 show schematic diagrams of first to eighth examples of the air flow mixing part of the ventilation mat according to the second embodiment. Note that in the description of the second embodiment, the components described in the first embodiment are denoted by the same reference symbols as those in the first embodiment, and the description thereof will be omitted.

First, a ventilation mat 2a having the first example (FIG. 4) of the air flow mixing part 14 according to the second embodiment is different from the ventilation mat 1 according to the first embodiment in regard to the position of the spacer 22. Specifically, in the ventilation mat 2a, the spacer 22 is attached to the right end of the side of the ventilation mat body 10 on which the air flow mixing part 14 is formed. Even if the connection part is located at such a position, by providing the air flow mixing part 14 so that it penetrates the plurality of tubes 11, an air flow can be generated in the tube 11 located distant from the spacer 22 via the air flow mixing part 14. Note that the spacer 22 can be attached to the left end of the ventilation mat body, or can be attached to an intermediate position offset from the center line of the ventilation mat body 10.

In the ventilation mat 2b having the second example (FIG. 4) of the air flow mixing part 14 according to the second embodiment, the part of the spacer 22 in which the notched part 15 is inserted has a width larger than that of the part covered with the non-permeable tube. By increasing the width of the part in which the notched part 15 is inserted as described above, the spacer 22 is pressed down by the nonwoven fabric 12 when this part having a large width is covered with the nonwoven fabric 12. Accordingly, the ventilation guide 20 can be fixed by the ventilation mat body 10 in a more stable manner.

In a ventilation mat 2c having the third example (FIG. 4) of the air flow mixing part 14 according to the second embodiment, no slit is provided in the tubes 11 located at both ends of the plurality of tubes 11 constituting the ventilation mat body 10. By closing both ends of the slit constituting the air flow mixing part 14 with the tubes 11, the sealing degree of the air flow mixing part 14 increases. Thus, in the ventilation mat 2c, it is possible to increase an air flow rate of the tube 11 in which an air flow is generated via the air flow mixing part 14.

In a ventilation mat 2d having the fourth example (FIG. 4) of the air flow mixing part 14 according to the second embodiment, a slit serving as the air flow mixing part 14 is provided in an area located in the lateral direction of the connection part to which the spacer 22 is connected. Even if such a slit shape is used, the air flow rates of the plurality of tubes 11 constituting the ventilation mat body 10 can be made substantially uniform.

In a ventilation mat 2e having the fifth example (FIG. 5) of the air flow mixing part 14 according to the second embodiment, the same air flow mixing part 14 as that of the ventilation mat 1 according to the first embodiment is provided, and a slit serving as the air flow mixing part 14 is provided in an area located in the lateral direction of the connection part to which the spacer 22 is connected. When such a slit shape is used, it is possible to increase the air flow rate in the lateral direction, thereby further increasing the uniformity of the air flow rates of the plurality of tubes 11 constituting the ventilation mat body 10.

In a ventilation mat 2f having the sixth example (FIG. 5) of the air flow mixing part 14 according to the second embodiment, slits provided in the lateral direction and slits provided in the longitudinal direction (e.g., the direction in which the tubes 11 are extended) constitute the air flow mixing part 14. These slits in the longitudinal direction are provided so as to connect the slits provided in the lateral direction to one another. When such a slit shape is used, the volume of the space constituting the air flow mixing part 14 increases, and accordingly it is possible to increase the rate of the air flow flowing through the air flow mixing part 14, and to increase the uniformity of the air flow rates of the plurality of tubes 11.

In a ventilation mat 2g having the seventh example (FIG. 5) of the air flow mixing part 14 according to the second embodiment, an air flow diffusion hole 16 constitutes the air flow mixing part. This air flow diffusion hole 16 is a hole provided so as to penetrate the plurality of tubes 11. As described above, even if a hole, instead of a slit, constitutes the air flow mixing part 14, a lateral air flow that flows in all the plurality of tubes 11 is generated, and the air flow rates of the plurality of tubes 11 can be made substantially uniform.

In a ventilation mat having the eighth example (FIG. 6) of the air flow mixing part 14 according to the second embodiment, the ventilation mat itself is the same as the ventilation mat 1 according to the first embodiment. In the eighth example, an air flow diffusion groove 34 is provided in a seat cushioning material 33 facing the air flow mixing part 14. Since this air flow diffusion groove 34 substantially increases the volume of the air flow mixing part 14, the air flow rate of the air flow mixing part 14 increases. Thus, in the eighth example, the uniformity of the air flow rates of the plurality of tubes 11 can be increased. Note that FIG. 6 shows a fan 23 attached to the fan attachment hole 21 of the ventilation guide 20.

Third Embodiment

In a third embodiment, an example of forming the air flow mixing part 14 that further improves the uniformity of the air flow rates of the plurality of tubes 11 is described. Note that in the description of the third embodiment, the components described in the first embodiment are denoted by the same reference symbols as those in the first embodiment, and the description thereof will be omitted.

Figure 7:
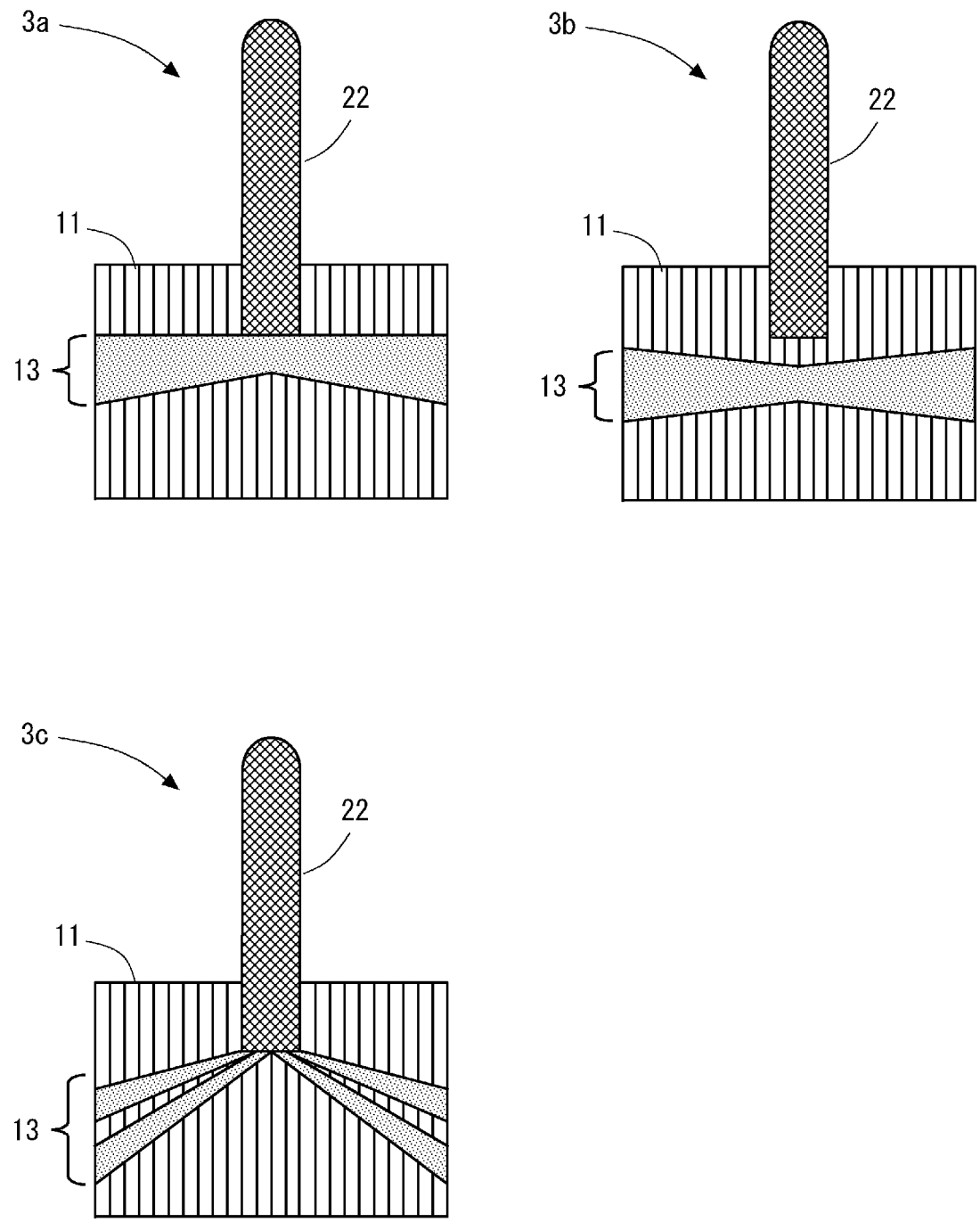
FIG. 7 shows schematic diagrams of first to third examples of the air flow mixing part of the ventilation mat according to a third embodiment.
Figure 8:
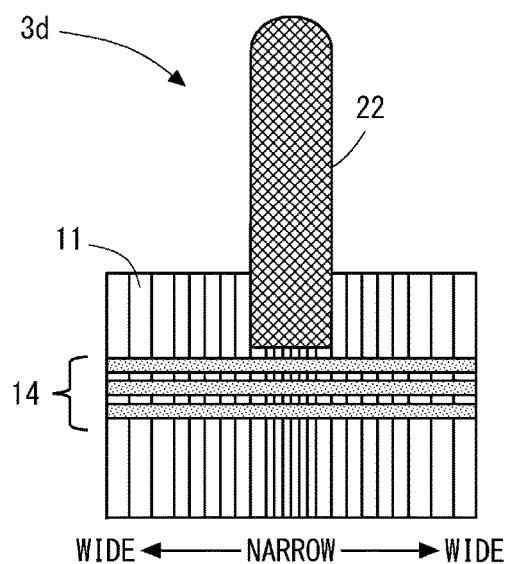
FIG. 8 shows schematic diagrams of fourth to seventh examples of the air flow mixing part of the ventilation mat according to the third embodiment.
Figure 8:
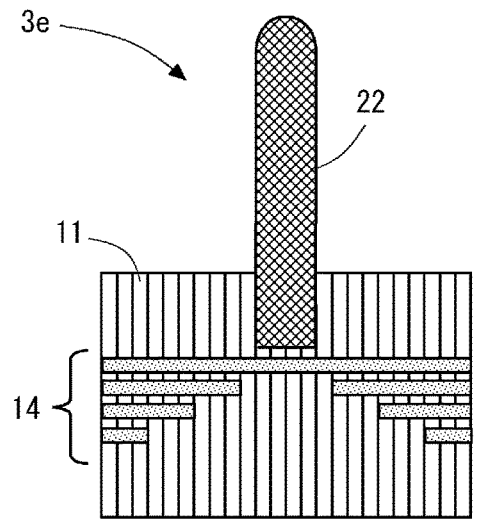
Figure 8:
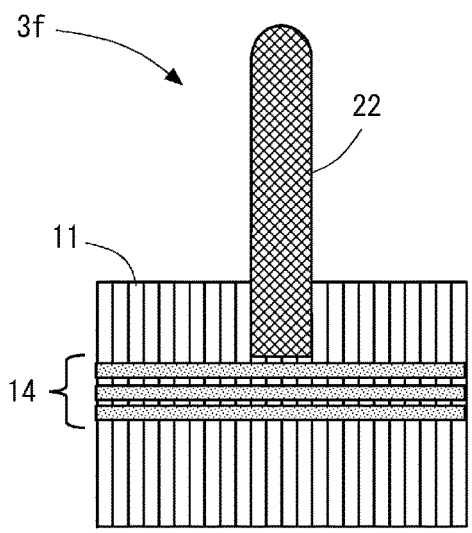
Figure 8:
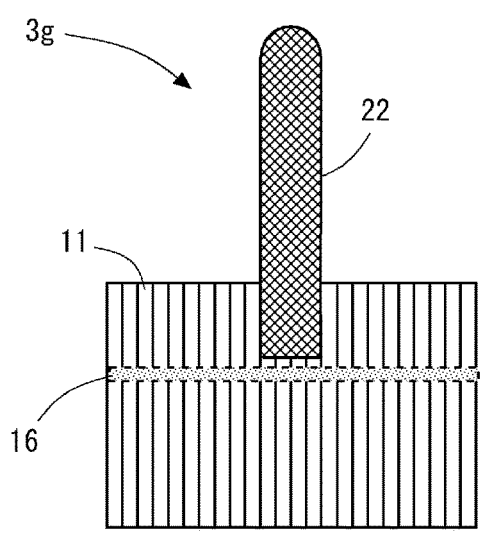
Figure 8:
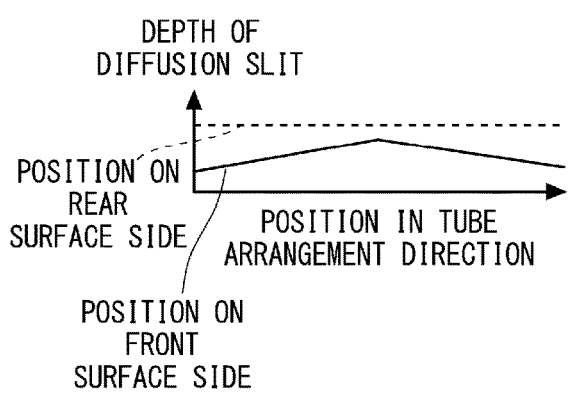
Figure 8:
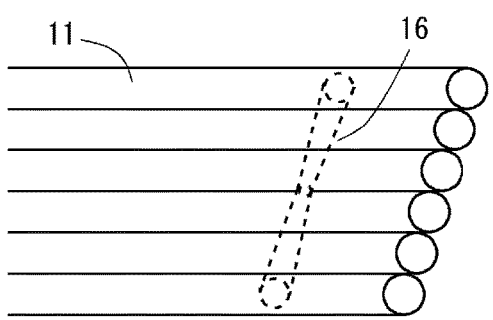
Figure 9:
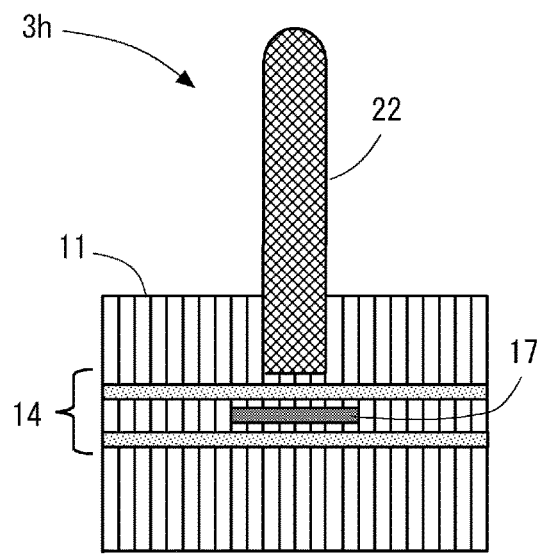
FIG. 9 shows schematic diagrams of eighth to tenth examples of the air flow mixing part of the ventilation mat according to the third embodiment.
Figure 9:
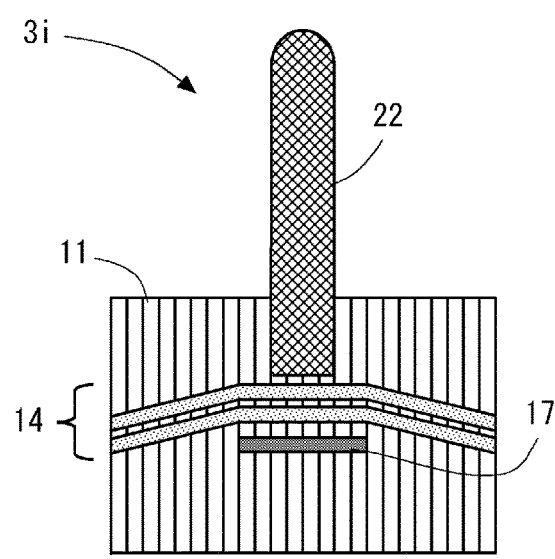
Figure 9:
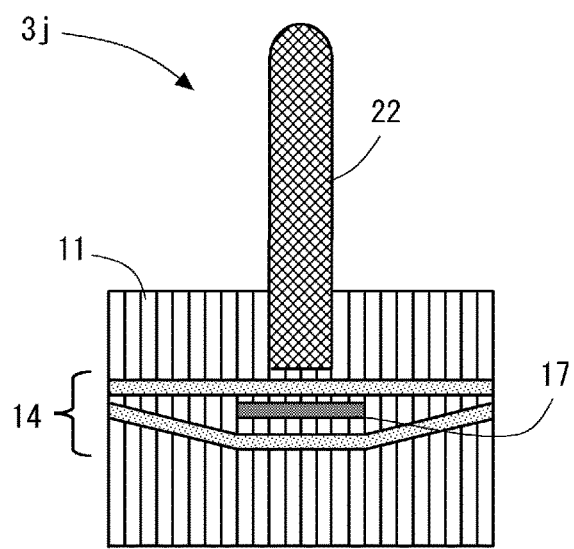

The rates of the air flow flowing through the plurality of tubes 11 tend to be reduced as the distance from the connection part between the ventilation mat body 10 and the spacer 22 increases. Therefore, the air flow mixing part 14 according to the third embodiment is provided so that the spatial volume of the air flow mixing part 14 increases as the distance thereof from the connection part increases. FIGS. 7 to 9 show schematic diagrams of first to tenth examples of the air flow mixing part of the ventilation mat according to the third embodiment.

In ventilation mats 3a and 3b having the first and the second example (FIG. 7) of the air flow mixing part 14 according to the third embodiment, the width of the slit constituting the air flow mixing part 14 is made to become smaller as it comes closer to the connection part between the ventilation mat body 10 and the spacer 22. By doing so, the spatial volume of the air flow mixing part 14 becomes smaller as it comes closer to the connection part, and an air resistance thereof becomes larger as it comes closer to the connection part. Thus, it is possible to increase the air flow rates of the tubes 11 located distant from the connection part.

In a ventilation mat 3c having the third example (FIG. 7) of the air flow mixing part 14 according to the third embodiment, a slit constituting the air flow mixing part 14 is formed in the oblique direction toward the connection part between the ventilation mat body 10 and the spacer 22 from the side surface of the ventilation mat body 10. Further, the shape of this slit is formed so that the width thereof becomes smaller as it comes closer to the connection part. By doing so, the spatial volume of the air flow mixing part 14 becomes smaller as it is closer to the connection part, and air resistance thereof becomes larger as it is closer to the connection part. Thus, it is possible to increase the air flow rates of the tubes 11 located distant from the connection part.

In a ventilation mat 3d having the fourth example (FIG. 8) of the air flow mixing part 14 according to the third embodiment, the diameter of the hole in the tube is made to become smaller as it comes closer to the connection part between the ventilation mat body 10 and the spacer 22. Further, the air flow mixing part 14 similar to that of the first embodiment is formed on the ventilation mat body 10 composed of the above-described tubes 11 having different internal diameters. By doing so, the air flow rate in the tube is reduced as it comes closer to the connection part, thereby enabling the air flow rate of the tube 11 located distant from the connection part to be increased.

In a ventilation mat 3e having the fifth example (FIG. 8) of the air flow mixing part 14 according to the third embodiment, the number of slits constituting the air flow mixing part 14 increases as the distance from the connection part between the ventilation mat body 10 and the spacer 22 increases. By doing so, the spatial volume of the air flow mixing part 14 becomes smaller as it is closer to the connection part, and air resistance thereof becomes larger as it is closer to the connection part. Thus, it is possible to increase the air flow rates of the tubes 11 located distant from the connection part.

In a ventilation mat 3f having the sixth example (FIG. 8) of the air flow mixing part 14 according to the third embodiment, the depth of the slit constituting the air flow mixing part 14 increases as the distance from the connection part between the ventilation mat body 10 and the spacer 22 increases. By doing so, the spatial volume of the air flow mixing part 14 becomes smaller as it is closer to the connection part, and air resistance thereof becomes larger as it is closer to the connection part. Thus, it is possible to increase the air flow rates of the tubes 11 located distant from the connection part.

In a ventilation mat 3g having the seventh example (FIG. 8) of the air flow mixing part 14 according to the third embodiment, the airflow diffusion hole 16 constitutes the air flow mixing part. This air flow diffusion hole 16 is a hole provided so as to penetrate the plurality of tubes 11, and is formed so that the diameter thereof becomes smaller as it comes closer to the connection part between the ventilation mat body 10 and the spacer 22. By doing so, the spatial volume of the air flow mixing part 14 becomes smaller as it comes closer to the connection part, and air resistance thereof becomes larger as it comes closer to the connection part. Thus, it is possible to increase the air flow rates of the tubes 11 located distant from the connection part.

In ventilation mats 3h to 3j having the eighth to the tenth examples (FIG. 9) of the air flow mixing part 14 according to the third embodiment, the rate of the air flow flowing linearly between the tubes 11 and the spacer 22 is reduced by providing an air flow blocking part 17 in a part where an air flow generated by the spacer 22 linearly flows. By doing so, an effect of the air flow diffusion due to the air flow mixing part 14 is enhanced. Note that the shape of the slit of the air flow mixing part 14 may be a straight line, a dogleg shape, or a combination thereof. Further, the air flow blocking part 17 can be formed by a method such as putting a plug in the hole of the tube.

Fourth Embodiment

In a fourth embodiment, another example of forming the air flow mixing part 14 that further improves the uniformity of the air flow rates of the plurality of tubes 11 is described. Note that in the description of the fourth embodiment, the components described in the first embodiment are denoted by the same reference symbols as those in the first embodiment, and the description thereof will be omitted.

Figure 10:
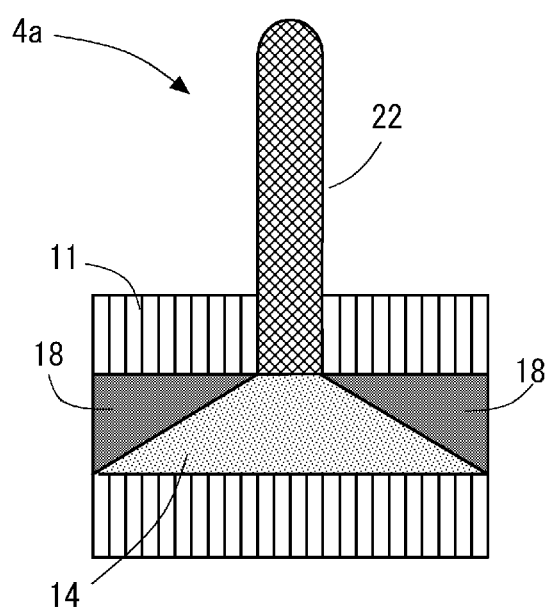
FIG. 10 shows schematic diagrams of first to third examples of the air flow mixing part of the ventilation mat according to a fourth embodiment.
Figure 10:
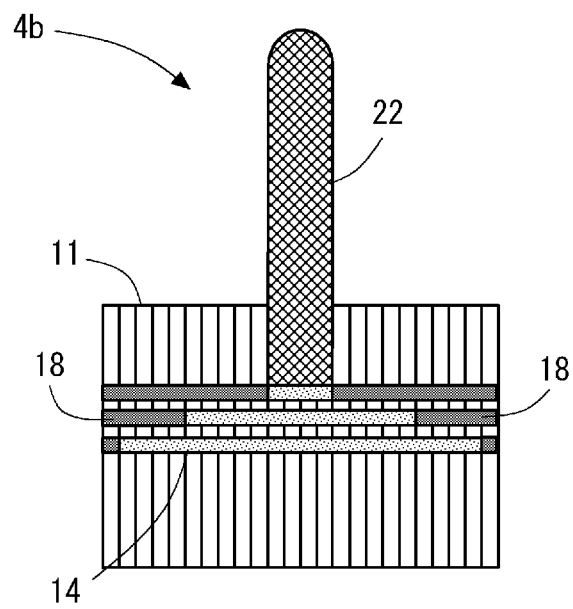
Figure 10:
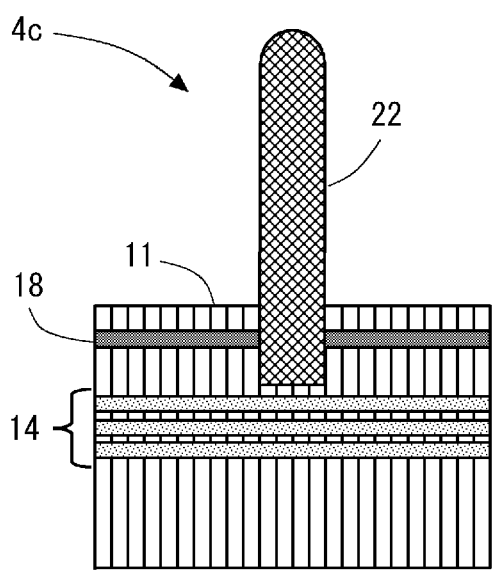

In the ventilation mat 1 according to the first embodiment, an air flow leaks in the areas adjacent to both sides of the notched part 15 formed in the ventilation mat body 10. FIG. 10 shows schematic diagrams of first to third examples of the air flow mixing part of the ventilation mat according to the fourth embodiment.

As shown in FIG. 10, in ventilation mats 4a, 4b, and 4c according to the fourth embodiment, an air flow leakage preventing part 18 is provided so that a part of the air flow mixing part 14 is filled to prevent an air flow leakage to both adjacent sides of the notched part 15. In the ventilation mat 4a, this air flow leakage preventing part 18 has a triangular shape, and is formed so that the width of the air flow mixing part 14 increases as the distance from the connection part increases. In the ventilation mat 4b, the air flow leakage preventing part 18 is formed so as to fill both ends of a plurality of slits. Further, the air flow leak preventing part 18 is provided so that the width of the slit serving as the air flow mixing part 14 increases as the distance from the connection part increases. In the ventilation mat 4c, the air flow leakage preventing part 18 is formed so as to extend in a direction orthogonal to the direction in which the tubes 11 are extended in the areas adjacent to both sides of the spacer 22. Note that when the air flow leakage preventing part 18 blocks a flow of the air flow on the ventilation part 13 side with respect to the connection part (e.g., the ventilation mats 4a and 4b), it is necessary to prevent an excessive increase in the number of tubes 11, which stop the flow of the air flow.

By providing the air flow leakage preventing part 18 as described above, the air flowing through the plurality of tubes 11 flows to the spacer 22 without leaking, thereby enabling the overall flow rate of the air flowing through the plurality of tubes 11 to be increased.

Fifth Embodiment

Figure 11:
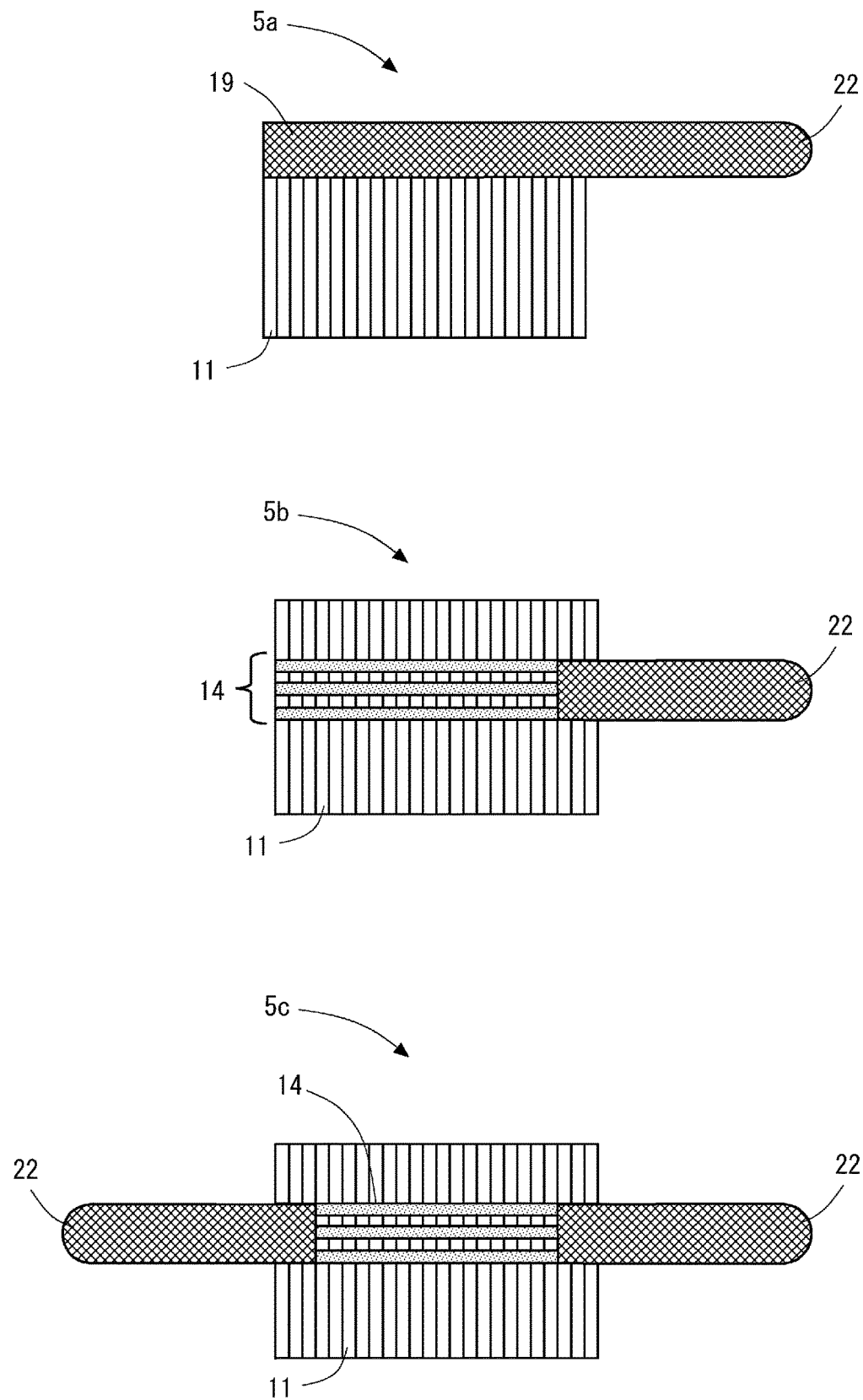
FIG. 11 shows schematic diagrams of first to third examples of the air flow mixing part of the ventilation mat according to a fifth embodiment.

In a fifth embodiment, an example in which the spacer 22 is connected in a direction orthogonal to the direction, in which the tubes 11 are extended, is described. FIG. 11 shows schematic diagrams of first to third examples of the air flow mixing part of the ventilation mat according to the fifth embodiment. Note that in the description of the fifth embodiment, the components described in the first embodiment are denoted by the same reference symbols as those in the first embodiment, and the description thereof will be omitted.

In a ventilation mat 5a having the first example according to the fifth embodiment, an air flow diffusion structure 19 formed of the same material as that of the spacer 22 is provided at the ends of the plurality of tubes 11 constituting the ventilation mat body 10. The air flow diffusion structure 19 may be formed integrally with the spacer 22. This air flow diffusion structure 19 is provided so as to cover all ends of the plurality of tubes 11 constituting the ventilation mat body 10. By doing so, the air flow diffusion structure 19 exhibits an air flow diffusion effect equivalent to that of the airflow mixing part 14. Further, in the ventilation mat 5a, a direction in which the spacer 22 is extended is a direction orthogonal to the direction in which the tubes 11 are extended. Note that the direction in which the spacer 22 is extended can be the same direction as the direction in which the tubes 11 are extended.

In a ventilation mat 5b having the second example according to the fifth embodiment, a slit carved in the ventilation mat body 10 in a direction orthogonal to the direction in which the tubes 11 are extended constitutes the air flow mixing part 14. Further, the spacer 22 is provided so as to project from one end of this air flow mixing part 14 in the direction orthogonal to the direction in which the tubes 11 are extended.

In a ventilation mat 5c having the third example according to the fifth embodiment, a slit carved in the ventilation mat body 10 in a direction orthogonal to the direction in which the tubes 11 are extended constitutes the air flow mixing part 14. Further, the spacers 22 are provided so as to project from both ends of this air flow mixing part 14 in the direction orthogonal to the direction in which the tubes 11 are extended.

Sixth Embodiment

In a sixth embodiment, a ventilation mat 6 which is another form of the ventilation mat 1 according to the first embodiment is described. Note that in the description of the sixth embodiment, the components described in the first embodiment are denoted by the same reference symbols as those in the first embodiment, and the description thereof will be omitted.

Figure 12:
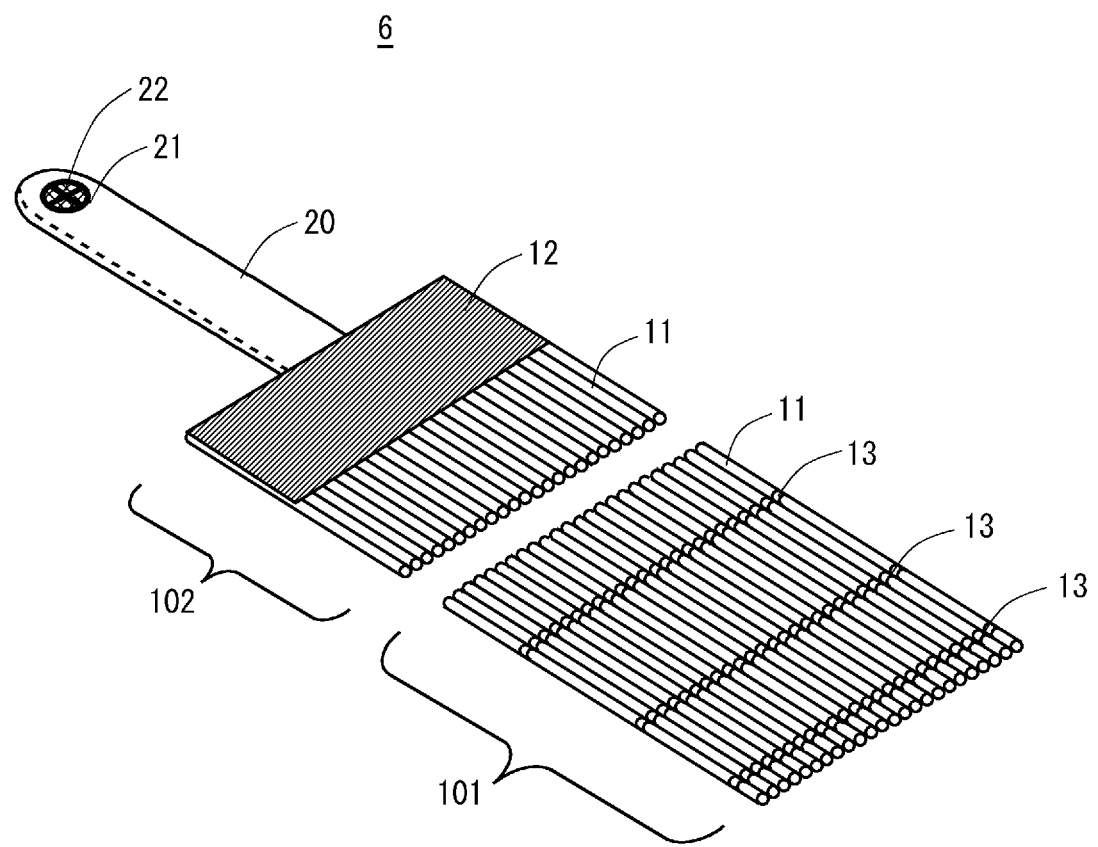
FIG. 12 is a schematic diagram of the air flow mixing part of the ventilation mat according to a sixth embodiment.

FIG. 12 shows a schematic diagram of the ventilation mat 6 according to the sixth embodiment. As shown in FIG. 12, in the ventilation mat 6 according to the sixth embodiment, the ventilation mat body 10 is provided in a state in which it is divided into a first ventilation mat body 101 and a second ventilation mat body 102. Further, the ventilation part 13 is provided in the first ventilation mat body 101. The connection part of the ventilation guide 20 is provided in the second ventilation mat body 102. Note that in the example shown in FIG. 12, the air flow mixing part 14 is not provided in the ventilation mat body 10 in the ventilation mat 6 according to the sixth embodiment, and a gap generated between the first and the second ventilation mat bodies 101 and 102 in a mounted state is used as the air flow mixing part. Details of the air flow mixing part according to the sixth embodiment will be described later.

Figure 13:
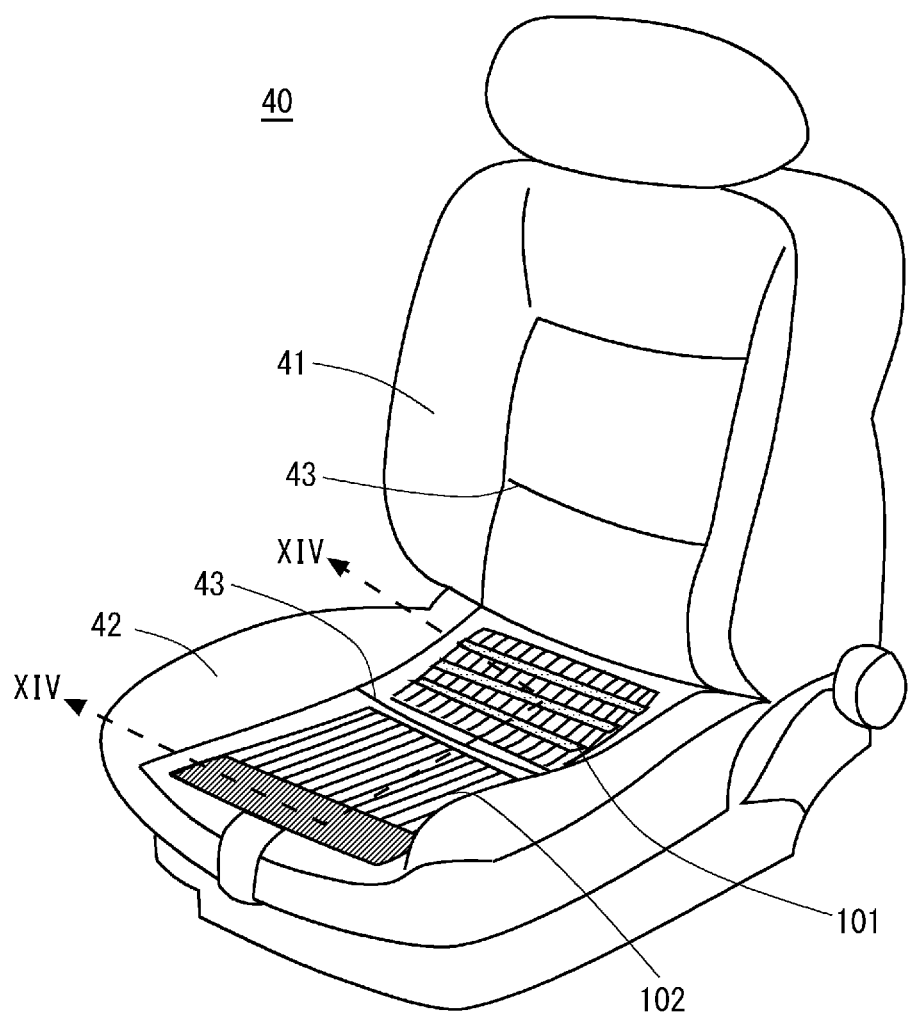
FIG. 13 is a schematic diagram of an automobile seat on which the ventilation mat according to the sixth embodiment is mounted.

Next, a configuration in which the ventilation mat 6 according to the sixth embodiment is integrated into an automobile seat is described. FIG. 13 is a schematic diagram of the automobile seat on which the ventilation mat 6 according to the sixth embodiment is mounted. The ventilation mat 6 according to the sixth embodiment is mounted on an automobile seat 40 in a state in which it is hidden by the skin cover since it is actually installed under the skin cover. Therefore, in the schematic diagram shown in FIG. 13, the ventilation mat body 10 is shown on a seat surface 42 so that the part of the automobile seat 40 in which the ventilation mat 6 is installed can be seen.

As shown in FIG. 13, the automobile seat 40 includes a backrest 41 and the seat surface 42. Further, pulling-in parts 43 are provided in the backrest 41 and the seat surface 42, respectively. The pulling-in part 43 is a part in which the skin cover is coupled to the cushioning material by a pulling-in member. In the ventilation mat 6 according to the sixth embodiment, the first and the second ventilation mat bodies 101 and 102 are used as a pair of sheets, and the first and the second ventilation mat bodies 101 and 102 are arranged so as to sandwich the pulling-in member.

Figure 14:
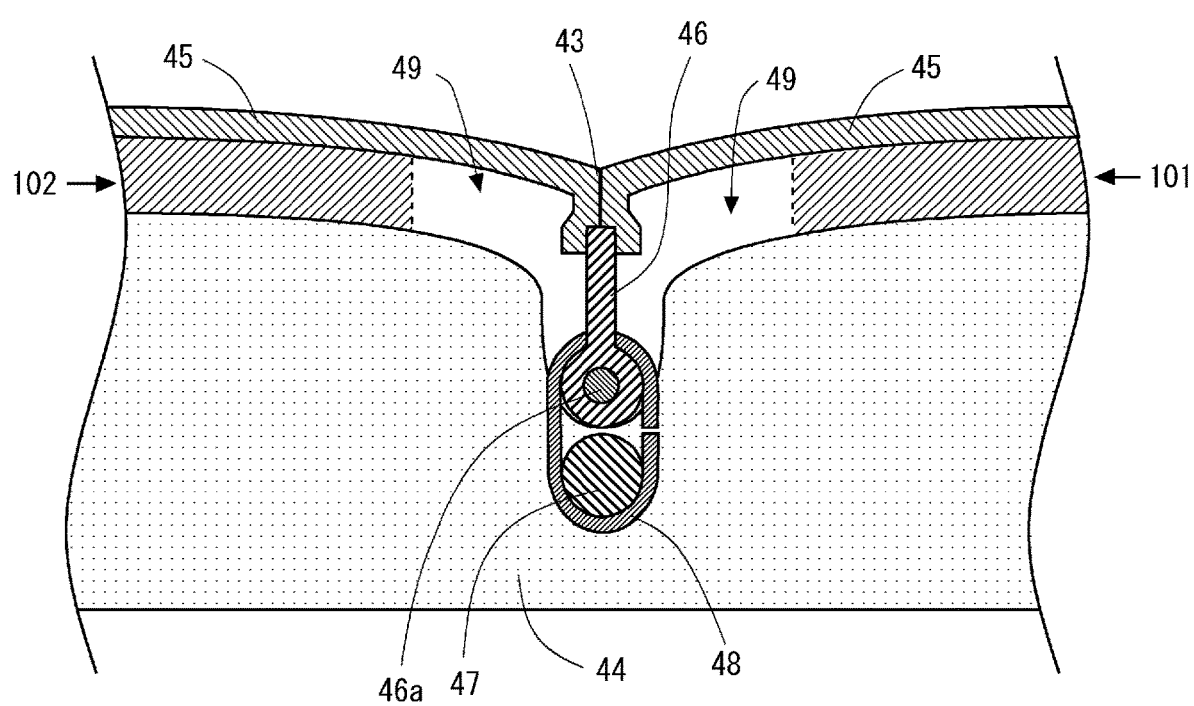
FIG. 14 is a cross-sectional view of the vicinity of a pulling-in part of a seat for an automobile on which the ventilation mat according to a sixth embodiment is mounted.

The structure in the vicinity of the aforementioned pulling-in member is more specifically described. FIG. 14 shows a cross-sectional view of the pulling-in part of the automobile seat on which the ventilation mat according to the sixth embodiment is mounted, which view is taken along the line XIV-XIV of FIG. 13.

As shown in FIG. 14, the first and the second ventilation mat bodies 101 and 102 are provided at positions sandwiched between a cushioning material 44 and a skin cover 45. Further, the first ventilation and the second ventilation mat bodies 101 and 102 are arranged distant from each other so as to sandwich the pulling-in part 43. A pulling-in member 46 is provided in the pulling-in part 43, and the skin cover 45 is coupled to the cushioning material 44 so that the cushioning material 44 pulls the skin cover 45 by this pulling-in member 46. Specifically, a groove corresponding to the place where the pulling-in member 46 is attached to the skin cover 45 described above is formed in the cushioning material 44. Further, a metal wire is embedded as a fixing member 47 at the bottom of the groove. The above-described cushioning material 44 and skin cover 45 are coupled to each other by pulling the pulling-in member 46 of the skin cover 45 into the bottom of the groove of the cushioning material 44 and then fixing the pulling-in member 46 and the fixing member 47 by a stopper 48 such as a hook ring. The skin cover 45 is brought into a tensioned state due to the tension generated by pulling this pulling-in member 46 into the bottom of the groove of the cushioning material 44.

Further, in the pulling-in member 46, air holes are provided at positions corresponding to the cross section of the tube of the first ventilation mat body 101 and the cross section of the tube of the second ventilation mat body 102. Then, the air holes provide ventilation between the first and the second ventilation mat bodies 101 and 102. Further, the area between the first and the second ventilation mat bodies 101 and 102, which is formed so that it sandwiches the pulling-in member 46, serves as an air flow mixing part 49 in which a lateral air flow is generated since there is nothing to obstruct the area in the lateral direction.

In this case, the distance between the pulling-in member 46 and the cross section of the first ventilation mat body 101 and the distance between the pulling-in members 46 and the cross section of the second ventilation mat body 102 are preferably set within a predetermined range. If these distances are too short, the cross section of the first ventilation mat body 101 and the cross section of the second ventilation mat body 102 are covered by the pulling-in member 46 and the cushioning material 44 when the positions of the cross sections of the first and the second ventilation mat bodies 101 and 102 shift due to the pressure at the time someone sits on the seat, and thus ventilation may not be performed. Further, if these distances are too long, the skin cover 45 and the cushioning material 44 may come into contact with each other due to a pressure at the time someone sits on the seat, and thus ventilation may not be performed. When it is assumed that the distance between the pulling-in member 46 and the cross section of the first ventilation mat body 101 is D1, the maximum thickness of the first ventilation mat body 101 is T1, the distance between the pulling-in member 46 and the cross section of the second ventilation mat body 102 is D2, the maximum thickness of the second ventilation mat body 102 is T2, it is preferred that the D1 be 0.2 to 2 times T1, and the D2 be 0.2 to 2 times T2. Note that the maximum thickness of the first ventilation mat body 101 and the maximum thickness of the second ventilation mat body 102 are each usually the outside diameter of the tube 11 in the cross section.

Figure 15:
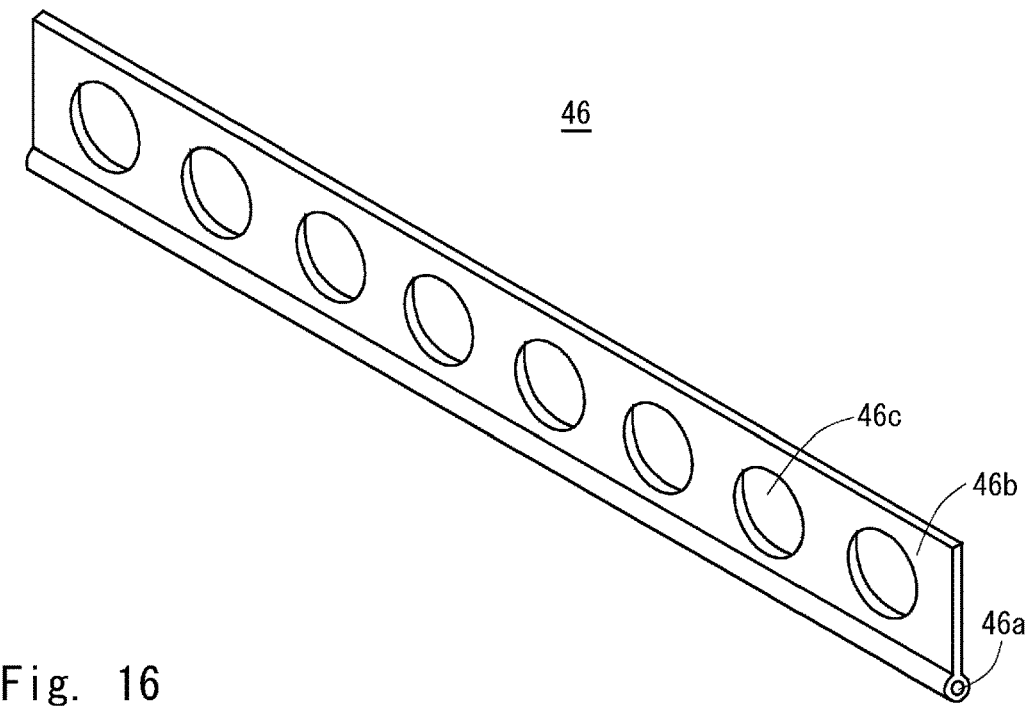
FIG. 15 is a diagram showing a structure of a pulling-in member according to the sixth embodiment.

Here, the pulling-in member 46 is more specifically described. FIG. 15 shows a diagram showing a structure of the pulling-in member according to the sixth embodiment. As shown in FIG. 15, the pulling-in member 46 includes a core 46a and a belt-like body 46b. The belt-like body 46b is made of a non-woven fabric of a polyester fiber. Further, a plurality of air holes 46c each having a diameter of 20 mm are formed at intervals of, for example, 10 mm in the belt-like body 46b. In the example shown in FIG. 15, although the shape of the air hole 46c is circular, the shape thereof can be various shapes such as an ellipse, a square, and a rectangle. This belt-like body 46b has a structure in which one end of the long side thereof is sewn to the skin cover 45, and the core 46a made of a metal wire is wound around the other end of the long side of the belt-like body 46b and fixed thereto.

Figure 16:
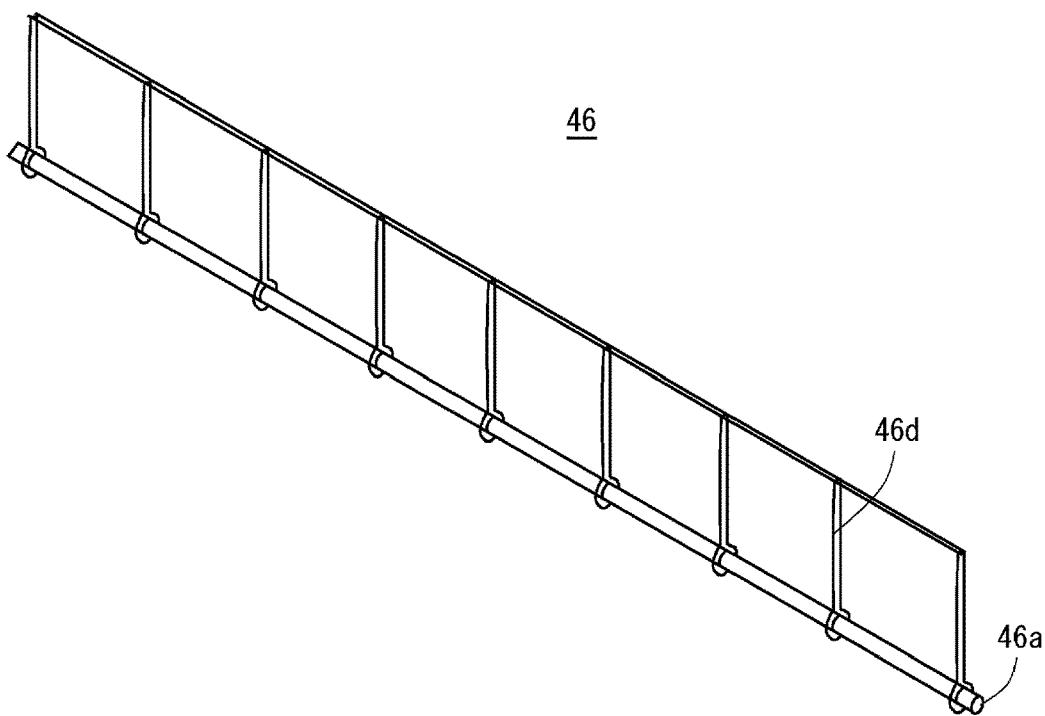
FIG. 16 is a diagram showing a structure of a different example of the pulling-in member according to the sixth embodiment.

Note that in the example shown in FIG. 15, although the belt-like body 46b made of a polyester nonwoven fabric is used, various materials such as a nonwoven fabric made of various materials, a woven fabric, a plastic sheet, a rubber sheet, and a hybrid material of these materials may be used. For example, a material sandwiching a sufficiently coarse mesh-like woven fabric between sufficiently coarse nonwoven fabrics may be used. Further, an air-permeable material such as a high porosity material may be used as the belt-like body 46b itself instead of forming the air hole 46c. Further, a plurality of linear bodies 46d as shown in FIG. 16 can be used instead of the belt-like body 46b, and a material in which these linear bodies 46d are arranged at predetermined intervals can be used.

Figure 17:
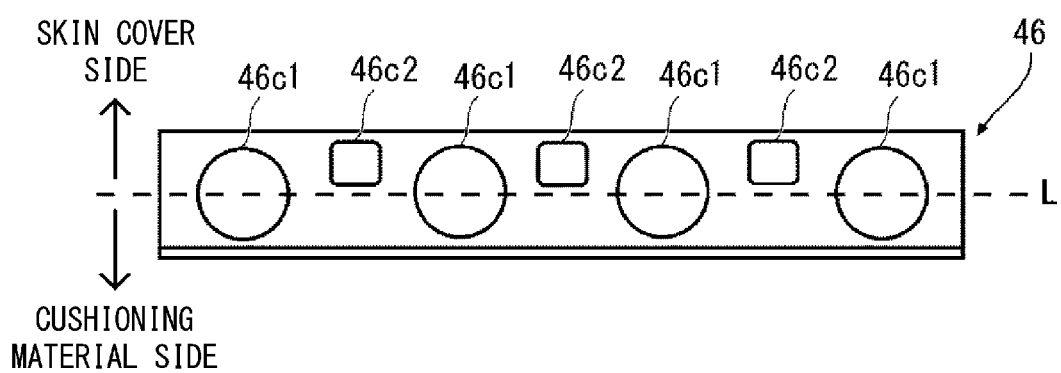
FIG. 17 is a diagram showing a structure of a different example of the pulling-in member according to the sixth embodiment.

Further, when the pulling-in member 46 in which the air holes 46c are formed in the belt-like body 46b as shown in FIG. 15 is used, the position, the size, the shape, and the like of the air hole 46c can be variously designed. However, in the case where the air holes 46c are formed in the vicinity of the core 46a, the air holes 46c may be buried in the bottom of the groove of the cushioning material 44 due to the tension when the fixing member 47 of the cushioning material 44 and the pulling-in member 46 are fixed by the stopper 48. Therefore, as shown in FIG. 17, with respect to a dividing line L that divides the pulling-in member 46 into two equal parts in parallel to the skin cover 45, air holes 46c1, at least some of which are located closer to the skin cover 45 side than the dividing line L is, may be provided in the pulling-in member 46. Further, as shown in FIG. 17, with respect to a dividing line L that divides the pulling-in member 46 into two equal parts in parallel to the skin cover 45, at least an air hole 46c2 located closer to the skin cover 45 side than the dividing line L may be provided in the pulling-in member 46. According to the above-described aspects, it is possible to blow air to the entire seat without the air holes 46c being buried in the cushioning material 44 even if tension generated by pulling the pulling-in member 46 into the cushioning material 44 is applied to the ventilation mat body. As described above, in the present invention, the part of the pulling-in member 46 that is closer to the skin cover 45 side than the dividing line L preferably has a sufficient air permeability.

As described above, in the ventilation mat 6 according to the sixth embodiment, the first and the second ventilation mat bodies 101 and 102 constitute a single ventilation mat body. Accordingly, while the pulling-in part 46 required due to a seat design is appropriately located, the air flow mixing unit 49, which communicates in the direction in which the plurality of tubes 11 are arranged, is formed so as to sandwich the pulling-in part 46. Due to the aforementioned lateral air flow, it is possible to improve the uniformity of the air flow which flows into the plurality of tubes 11.

Seventh Embodiment

In a seventh embodiment, a ventilation mat 7 which is another form of the ventilation mat 1 according to the first embodiment is described. Note that in the description of the seventh embodiment, the components described in the first embodiment are denoted by the same reference symbols as those in the first embodiment, and the description thereof will be omitted.

Figure 18:
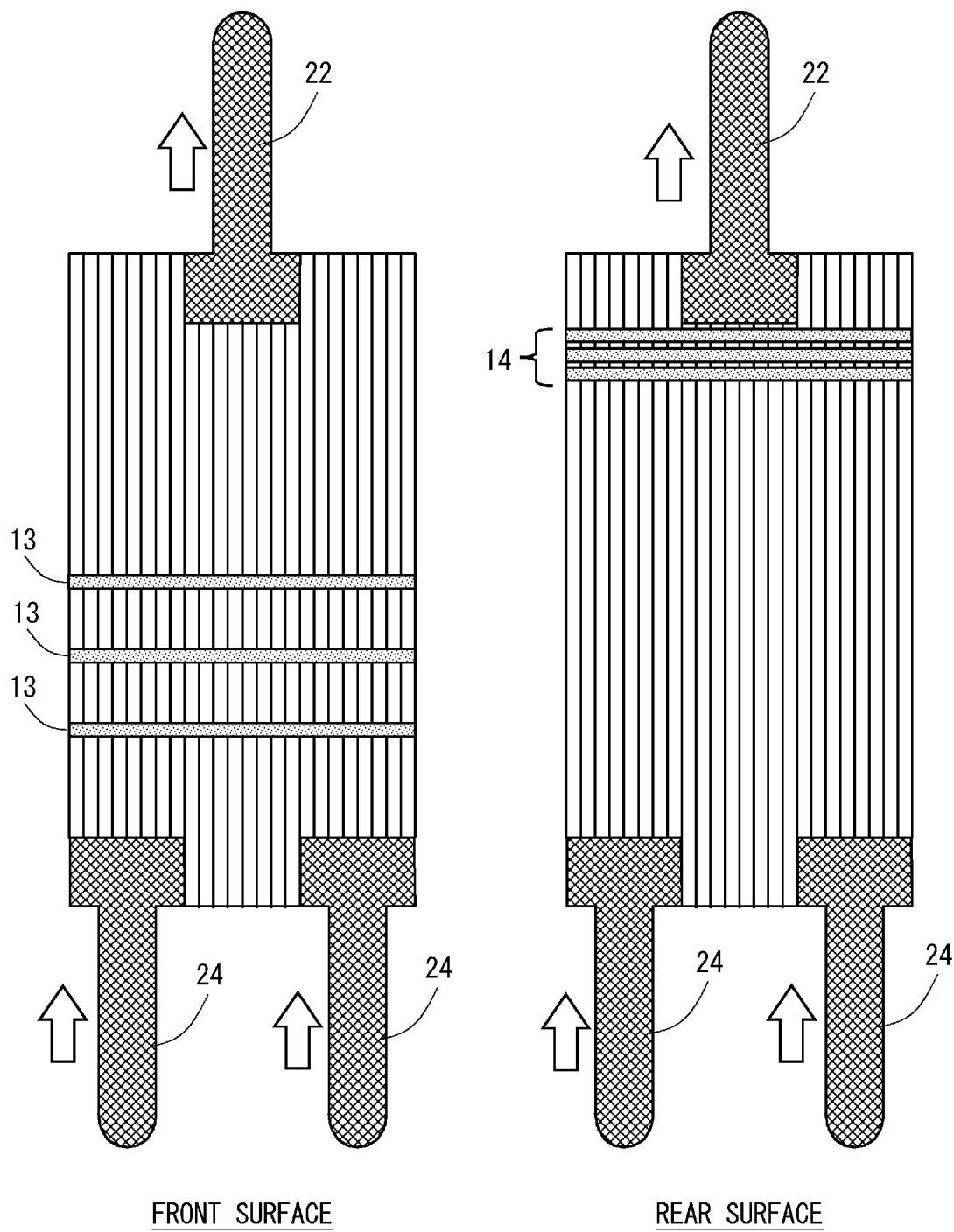
FIG. 18 is a diagram for explaining the detailed structure of the ventilation mat according to a seventh embodiment.

FIG. 18 shows a schematic diagram of the ventilation mat 7 according to the seventh embodiment. As shown in FIG. 18, the ventilation mat 7 according to the seventh embodiment is the same as the ventilation mat 1 according to the first embodiment except that the ventilation mat 7 further includes spacers 24. Like the spacer 22, the spacer 24 is covered with a non-permeable tube having a bag-like shape, and forms a ventilation path for passing an air flow generated by the fan.

In the ventilation mat 7, when the ventilation guide 20 including the spacer 22 as a ventilation path is a first ventilation guide, a ventilation guide including the spacer 24 as a ventilation path is a second ventilation guide. Then, the spacer 24 is connected to the side of the ventilation mat body 10 that faces the connection part connecting the spacer 22 to the ventilation mat body 10 with the ventilation part 13 interposed therebetween.

Note that in the example shown in FIG. 18, as the spacer 22 is connected to the vicinity of the center line of the ventilation mat body 10, the air flow rates of the tubes 11 located on both sides of the ventilation mat body 10 are substantially equally reduced. Therefore, in the example shown in FIG. 18, the spacer 22 is provided in the vicinity of the center line of the ventilation mat body 10, and two spacers 24 are provided in the vicinity of both side surfaces of the ventilation mat body 10 correspondingly.

Note that for example, when the spacer 22 is provided at a position along the right side surface of the ventilation mat body 10, only one spacer 24 is preferably provided at a position along the left side surface of the ventilation mat body 10.

In the ventilation mat 7 according to the seventh embodiment, when the spacer 22 is an exhaust path, the spacer 24 is an intake path. The spacer 22 can instead be an intake path and the spacer 24 can instead be an exhaust path.

By providing the ventilation guides at the positions of the spacer 22 and the spacer 24 shown in FIG. 18, and generating an air flow from the spacer 24 toward the spacer 22, the lateral flow of the air flow in the air flow mixing part 14 is promoted. By doing so, in the ventilation mat 7 according to the seventh embodiment, it is possible to provide an air flow having a high uniformity to the tubes 11 at a higher flow rate than that of the other embodiments.

Eighth Embodiment

In an eighth embodiment, a ventilation mat 8 which is another form of the ventilation mat 1 according to the first embodiment is described. Note that in the description of the eighth embodiment, the components described in the first embodiment are denoted by the same reference symbols as those in the first embodiment, and the description thereof will be omitted.

The ventilation mat according to the present invention is integrated into the seat surface and backrest of an automobile seat, in particular, in order to improve the comfort of the interior space of the automobile, and a seat heater that heats an automobile seat is also known as one that improves the comfort of the interior space of an automobile (see, for example, Japanese Patent No. 4202071). This seat heater and the ventilation mat according to the present invention can be used in combination. In this case, in order to efficiently transmit heat from the seat heater to a person who is seated, the seat heater is preferably located between the skin cover of the automobile seat and the ventilation mat. In addition, it would be required to provide a means to prevent heat from the seat heater from being transferred to the ventilation mat.

Figure 19:
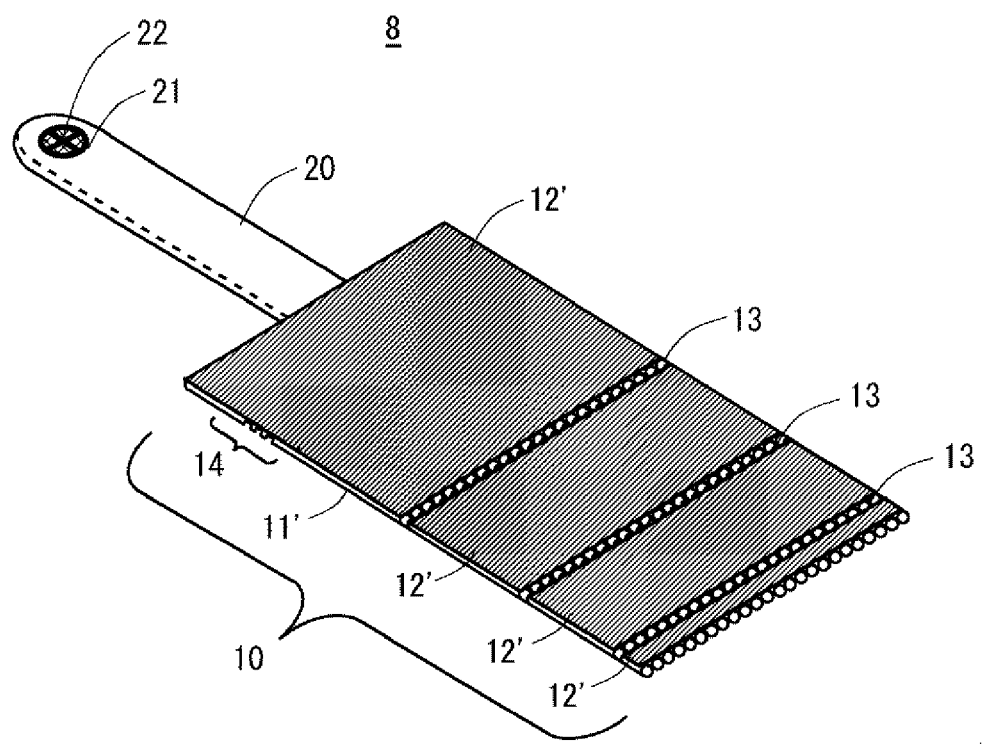
FIG. 19 is a schematic diagram of the ventilation mat according to an eighth embodiment.

FIG. 19 shows a schematic diagram of the ventilation mat 8 according to the eighth embodiment. As shown in FIG. 19, in the ventilation mat 8 according to the eighth embodiment, a heat insulating sheet 12' made of a nonwoven fabric is attached to substantially the entire surface of the ventilation mat body 10, in contrast to the ventilation mat 1 according to the first embodiment. One aspect of the ventilation part 13 is a slit provided so as to cut the tube 11' in a direction orthogonal to the direction in which the tube 11' is extended, and in addition to the tube 11' being cut, the heat insulating sheet 12' is also cut. That is, in each of the tube 11' and the heat insulating sheet 12', a slit is formed at the same position, so as to form the ventilation part 13. Further, the tube 11' is composed of a foamed material such as a foamed olefin-based thermoplastic elastomer, and is insulated by reducing the thermal conductivity of the tube. Note that it is considered that the ventilation mat body 10 is formed into a shape in which a plurality of tubes 11' are coupled to one another, such as a shape like a sheet having a plurality of holes continuously formed in a longitudinal direction, by a method such as extrusion molding rather than making the ventilation mat body 10 by coupling the plurality of tubes 11'. When a plurality of tubes 11' are coupled to one another, the part in which the tubes 11' come into contact with one another is twice as thick as the wall thickness. In contrast, when the ventilation mat body 10 is formed into the shape in which the plurality of tubes 11' are coupled to one another, the thickness of the part in which the tubes 11' come into contact with one another can be the same thickness as the wall thickness, whereby the cross-sectional area of the ventilating part can be further increased. Further, for example, it is considered that a plurality of tubes 11' are formed into a shape in which they are coupled to one another, and then the shaped tubes are arranged and further coupled to one another. Further, the cross-sectional shape of the tube 11' is not required to be circular, and can be set as appropriate, such as a cross-sectional quadrangle, a cross-sectional octagon, a cross-sectional semicircle, and a combination thereof, while the crushing resistance of the tube 11' and the cross-sectional area of the ventilating part are taken into consideration.

Figure 20:
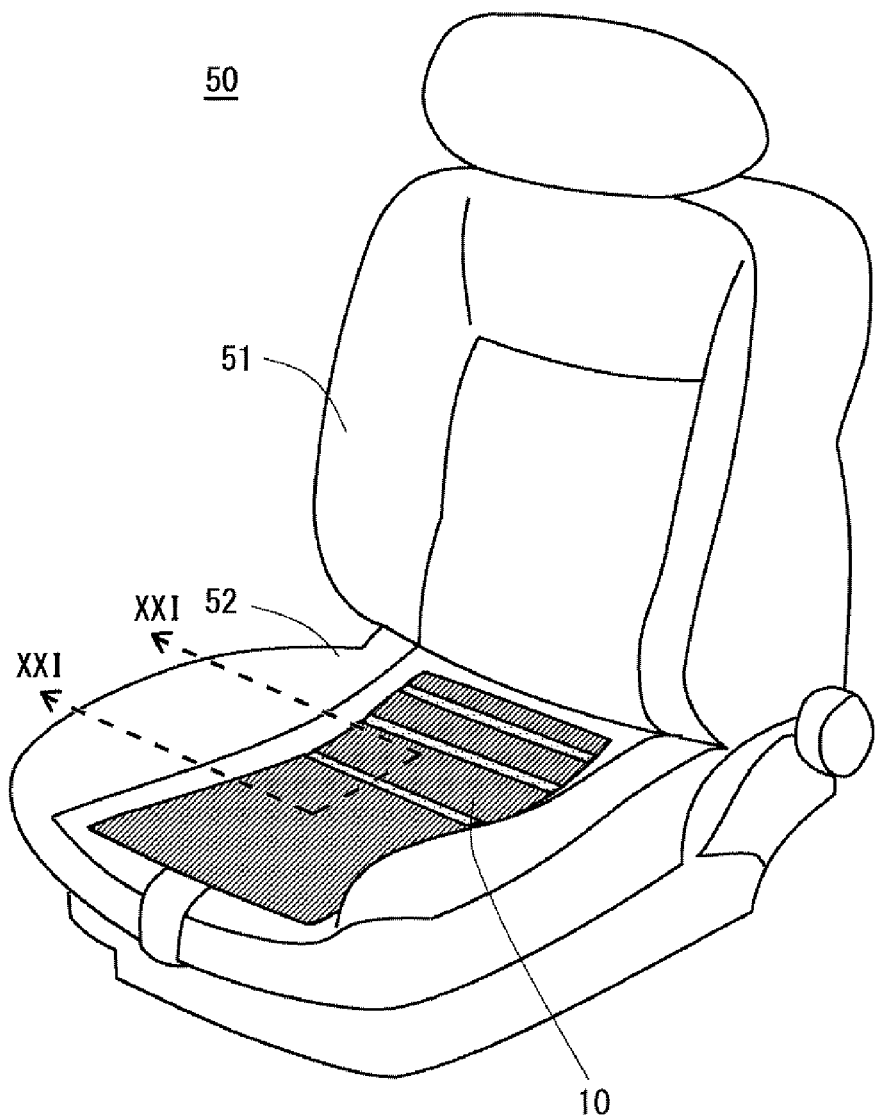
FIG. 20 is a schematic diagram of an automobile seat on which the ventilation mat according to the eighth embodiment is mounted.

Next, a configuration in which the ventilation mat 8 according to the eighth embodiment is integrated into an automobile seat is described. FIG. 20 is a schematic diagram of the automobile seat on which the ventilation mat 8 according to the eighth embodiment is mounted. The ventilation mat 8 according to the eighth embodiment is mounted on an automobile seat 50 in a state in which it is hidden by the skin cover since it is actually installed under the skin cover. Therefore, in the schematic diagram shown in FIG. 20, the ventilation mat body 10 is shown on a seat surface 52 so that the part of the automobile seat 50 in which the ventilation mat 8 is installed can be seen.

In the example shown in FIG. 20, the ventilation mat body 10 is provided on the seat surface 52. Note that a ventilation mat body may be provided in a backrest 51. In FIG. 20, a seat heater is installed between the ventilation mat body and the skin cover, which is omitted.

Figure 21:
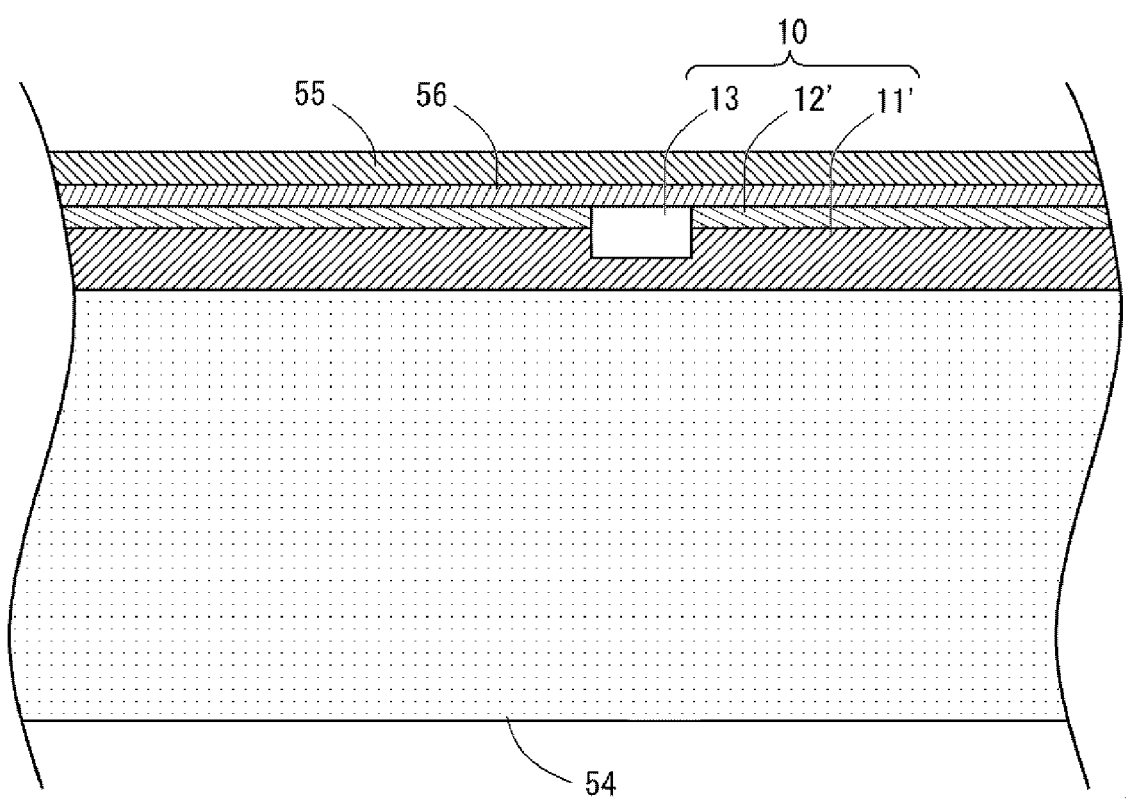
FIG. 21 is a cross-sectional view of the vicinity of the installation location of a seat heater of an automobile seat on which the ventilation mat according to the eighth embodiment and a seat heater.

The structure of a location where this seat heater is installed is more specifically described. FIG. 21 shows a cross-sectional view of the automobile seat on which the ventilation mat 8 according to the eighth embodiment is mounted, which view is taken along the line XXI-XXI of FIG. 20. The ventilation mat body 10 is provided on a cushioning material 54 of the automobile seat 50, a seat heater 56 is installed on that ventilation mat body 10, and the top of the seat heater 56 is covered with a skin cover 55. At this time, as the heat insulating material 12' and the ventilation part 13 of the ventilation mat body 10 are provided on the seat heater 56 side, a heat insulating sheet 12' having a low heat conductivity is interposed between the tube 11' and the sheet heater 56. Accordingly, heat can be prevented from being transferred from the seat heater 56 to the tube 11', whereby the heat of the seat heater 56 can be efficiently transferred to a person who is seated. Note that as the heat insulating sheet 12', a material having high heat insulating properties such as a foamed resin can be used instead of a nonwoven fabric. Further, it is considered that another heat insulating material such as a urethane foam resin is interposed between the seat heater 56 and the ventilation mat 10.

When the ventilation mats 1 to 8 according to the present invention are integrated into the automobile seats 30, 40, and 50, for example, the ventilation mat bodies 10, 101, and 102 may be fixed on the cushioning materials 44 and 54 with an adhesive tape or the like. In addition to such a configuration, it is considered that, for example, when the cushioning materials 44 and 54 are formed, the ventilation mat bodies 10, 101, and 102 will be located in advance in a forming mold, the material of the cushioning material can be poured therein, and then the material of the cushioning material will be foamed and hardened. In this case, the ventilation mat bodies 10, 101, and 102, and the cushioning materials 44 and 54 can be securely fixed to prevent positional deviation. Such a construction method is common in the car seat heater technical field; for example, Patent Literature 2 can be referred to.

Note that the present invention is not limited to the aforementioned embodiments and may be changed as appropriate without departing from the spirit of the present invention.

This application is based upon and claims the benefit of priority from Japanese Patent Application No. 2017-108424, filed on May 31, 2017, Japanese Patent Application No. 2017-204922, filed on Oct. 24, 2017, and Japanese Patent Application No. 2017-245950, filed on Dec. 22, 2017, the disclosures of which are incorporated herein in its entirety by reference.

(Supplementary Note 1)

A seat comprising a skin cover and a seat cushioning material, the skin cover comprising a pulling-in member, the seat cushioning material comprising a fixing member, the pulling-in member and the fixing member being coupled to each other, wherein
the pulling-in member is air-permeable.

(Supplementary Note 2)

The seat described in Supplementary Note 1, wherein the pulling-in member has a belt-like body, and an air hole is formed in the belt-like body.

(Supplementary Note 3)

The seat described in Supplementary Note 1, wherein the pulling-in member has a core and a plurality of linear bodies, and the linear bodies are arranged at predetermined intervals.

(Supplementary Note 4)

The seat described in Supplementary Note 1, wherein the pulling-in member is composed of an air-permeable material.

(Supplementary Note 5)

The seat described in any one of Supplementary Notes 1 to 4, further comprising an air-blowing source and a ventilation path, wherein the ventilation path is located between the skin cover and the seat cushioning material, and divided at a position where the pulling-in member is located.

(Supplementary Note 6)

The seat described in Supplementary Note 5, wherein the ventilation path is formed into a sheet shape by integrating a plurality of tubes in parallel.

(Supplementary Note 7)

A pulling-in member configured to suspend a skin cover of a seat in a seat cushioning material of the seat, wherein the pulling-in member has an air permeability.

REFERENCE SIGNS LIST 1, 2a-2g, 3a-3j VENTILATION MAT
4a, 4b, 5a-5c, 6, 7, 8 VENTILATION MAT
10 VENTILATION MAT BODY
11 TUBE
12 NONWOVEN FABRIC
12' HEAT INSULATING SHEET
13 VENTILATION PART
14 AIR FLOW MIXING PART
15 NOTCHED PART
16 AIR FLOW DIFFUSION HOLE
17 AIR FLOW BLOCKING PART
18 AIR FLOW LEAKAGE PREVENTING PART
19 AIR FLOW DIFFUSION STRUCTURE
20 VENTILATION GUIDE
21 FAN ATTACHMENT HOLE
22 SPACER
23 FAN
24 SPACER
30, 40, 50 AUTOMOBILE SEAT
31, 41, 51 BACKREST
32, 42, 52 SEAT SURFACE
33 SEAT CUSHIONING MATERIAL
34 AIR FLOW DIFFUSION GROOVE
43 PULLING-IN PART
44, 54 CUSHIONING MATERIAL
45, 55 SKIN COVER
46 PULLING-IN MEMBER
46a CORE
46b BELT-LIKE BODY
46c AIR HOLE
46d LINEAR BODY
47 FIXING MEMBER
48 STOPPER
49 AIR FLOW MIXING PART
54 SEAT HEATER
101 FIRST VENTILATION MAT BODY
102 SECOND VENTILATION MAT BODY

The invention claimed is:

1. A ventilation mat provided between a seat cushioning material and a skin cover covering the seat cushioning material, the ventilation mat comprising:
   a ventilation mat body comprising a plurality of tubes coupled to one another in a sheet shape; and
   a ventilation guide with a fan attachment hole provided at one end thereof, the other end of the ventilation guide being connected to a side surface of the ventilation mat body, wherein
   the ventilation mat body comprises:
      a ventilation part with a slit provided on a side of the plurality of tubes coming into contact with the skin cover so as to be extended across the plurality of tubes, the ventilation part being coupled, with a material of the tube, to a side of the plurality of tubes coming into contact with the seat cushioning material; and
      an air flow mixing part that is provided closer to a connection part of the ventilation guide than the ventilation part is and communicates between the plurality of tubes, and
   the ventilation guide is a non-air-permeable tube, and includes a ventilation path formed inside thereof by a base material having an air-permeable three-dimensional structure.

2. The ventilation mat according to claim 1, wherein the air flow mixing part comprises a slit provided so as to be extended across at least one of the plurality of tubes.

3. The ventilation mat according to claim 1, wherein in the air flow mixing part, a space communicating between the plurality of tubes is formed so that an air resistance in the vicinity of the connection part of the ventilation guide is higher than that at a position distant from the connection part of the ventilation guide.

4. The ventilation mat according to claim 1, further comprises an air flow blocking part configured to partially block a flow of an air flow from the ventilation part to the connection part, the air flow blocking part being provided between the connection part of the ventilation guide and the ventilation part.

5. The ventilation mat according to claim 1, further comprises an air flow leakage preventing part configured to prevent an air flow from leaking from or entering into an opening provided at an end of plurality of tubes that does not face the ventilation guide among ends of the plurality of tubes on the connection part side of the ventilation guide.

6. The ventilation mat according to claim 1, wherein the air flow mixing part extends in a direction in which the tubes are arranged, and is formed so as to close one end of each of the plurality of tubes by a material same as a base material of the ventilation guide.

7. The ventilation mat according to claim 1, wherein
the ventilation mat body is formed so as to be divided into
a first ventilation mat body with the ventilation part provided therein, and a second ventilation mat body with the connection part of the ventilation guide provided therein, and the air flow mixing part is a space between the first ventilation mat body and the second ventilation mat body.

8. The ventilation mat according to claim 1, wherein the ventilation mat uses the ventilation guide as a first ventilation guide, and further comprises a second ventilation guide which is connected to a side of the ventilation mat body facing a connection part of the first ventilation guide with the ventilation part interposed therebetween.

9. The ventilation mat according to claim 1, wherein a heat insulating sheet is attached to substantially the entire surface of the ventilation mat body, and a slit is provided in the heat insulating sheet at the same position as that of the plurality of tubes.

10. The ventilation mat according to claim 1, wherein the plurality of tubes are made of a foamed material.

* * * * *